(12) United States Patent
Lee et al.

(10) Patent No.: US 12,509,575 B2
(45) Date of Patent: Dec. 30, 2025

(54) POLYETHYLENE COMPOSITION AND BIAXIALLY STRETCHED FILM COMPRISING SAME

(71) Applicant: LG Chem, Ltd., Seoul (KR)

(72) Inventors: Jong Chan Lee, Daejeon (KR); Eun Yeob Choi, Daejeon (KR); Yu Taek Sung, Daejeon (KR); Tae Jin Kim, Daejeon (KR); Jeong Kyu Lee, Daejeon (KR); Se Jung Park, Daejeon (KR); Sung Joon Oh, Daejeon (KR); Young Suk You, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 19/057,074

(22) Filed: Feb. 19, 2025

(65) Prior Publication Data
US 2025/0297085 A1    Sep. 25, 2025

(30) Foreign Application Priority Data

Mar. 21, 2024  (KR) .................. 10-2024-0039384

(51) Int. Cl.
*C08L 23/08*  (2025.01)
*C08F 2/00*  (2006.01)
(Continued)

(52) U.S. Cl.
CPC .......... *C08L 23/0815* (2013.01); *C08F 2/001* (2013.01); *C08F 210/02* (2013.01);
(Continued)

(58) Field of Classification Search
CPC ................. C08L 23/0815; C08L 23/08; C08L 2205/025; C08L 2203/16; B29C 55/12
See application file for complete search history.

(56) References Cited

U.S. PATENT DOCUMENTS 10,899,858 B2 *  1/2021  Wang .................. C08K 5/01
11,542,351 B2 *  1/2023  Lee .................... C08F 4/65912
(Continued)

FOREIGN PATENT DOCUMENTS

CN    106632779 B  * 11/2018
CN    106632778 B  * 12/2018
(Continued)

OTHER PUBLICATIONS

Alexakis, A. et al., "Mild Protection and Deprotection of Alcohols as Ter-Butyl Ethers in the Field of Pheromone Synthesis", Tetrahedron Letters, 1988, pp. 2951-2954, vol. 29, No. 24.
(Continued)

*Primary Examiner* — Rip A Lee
(74) *Attorney, Agent, or Firm* — Lerner David LLP

(57) ABSTRACT

A polyethylene composition may include one or more types of ethylene-alpha-olefin copolymers. In the polyethylene composition, a successive self-nucleation and annealing (SSA) thermogram representing a relationship between heat flow and temperature satisfies Equation 1: $0.16 \leq B/A \leq 0.4$. In Equation 1, A means an area for an entire temperature region in the SSA thermogram, and B means an area for a temperature region of 128° C. or higher in the SSA thermogram. A biaxially stretched film may include the polyethylene composition.

16 Claims, 2 Drawing Sheets

(51) Int. Cl.
  *C08F 210/02* (2006.01)
  *C08J 5/18* (2006.01)
  *C08L 23/0807* (2025.01)
  *B29C 55/12* (2006.01)

(52) U.S. Cl.
  CPC ............... *C08J 5/18* (2013.01); *B29C 55/12* (2013.01); *C08J 2323/08* (2013.01); *C08J 2423/08* (2013.01); *C08L 2203/16* (2013.01); *C08L 2205/025* (2013.01)

(56) References Cited

U.S. PATENT DOCUMENTS

| | | |
|---|---|---|
| 2020/0017668 A1 | 1/2020 | Wang et al. |
| 2021/0122858 A1 | 4/2021 | Miranda et al. |
| 2021/0332169 A1 | 10/2021 | Lee et al. |
| 2022/0306780 A1 | 9/2022 | Kim et al. |
| 2023/0235106 A1 | 7/2023 | Fereydoon et al. |
| 2024/0052146 A1 | 2/2024 | Konaganti et al. |
| 2024/0262946 A1 | 8/2024 | Li et al. |

FOREIGN PATENT DOCUMENTS

| | | | | |
|---|---|---|---|---|
| CN | 106632782 B | * | 12/2018 | |
| CN | 106632783 B | * | 2/2019 | |
| JP | 2023019592 A | | 2/2023 | |
| KR | 20100102854 A | | 9/2010 | |
| KR | 20200078145 A | | 7/2020 | |
| KR | 20210031460 A | | 3/2021 | |
| KR | 20210038372 A | | 4/2021 | |
| KR | 20210144348 A | * | 11/2021 | ............ C08F 210/16 |
| KR | 20210144352 A | * | 11/2021 | .......... C08F 4/65904 |
| KR | 20220120295 A | | 8/2022 | |
| KR | 20230017859 A | | 2/2023 | |
| KR | 20230154847 A | | 11/2023 | |
| KR | 20240022568 A | | 2/2024 | |

OTHER PUBLICATIONS

International Search Report for Application No. PCT/KR2025/003635 mailed Jun. 24, 25, 2010 p. [See p. 4, categorizing the cited references].

\* cited by examiner

[FIG. 1]
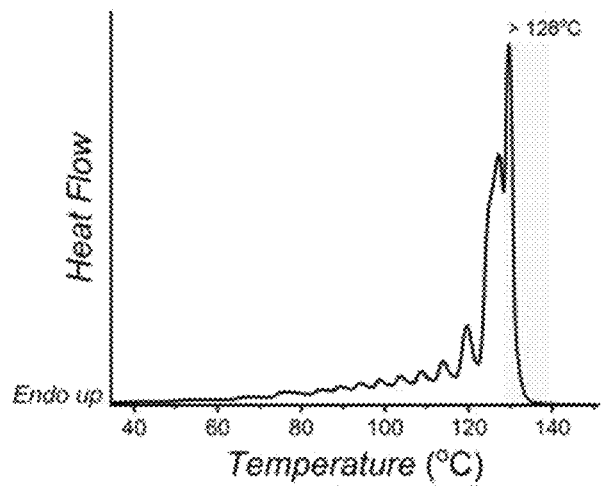
[FIG. 2]
Example 1
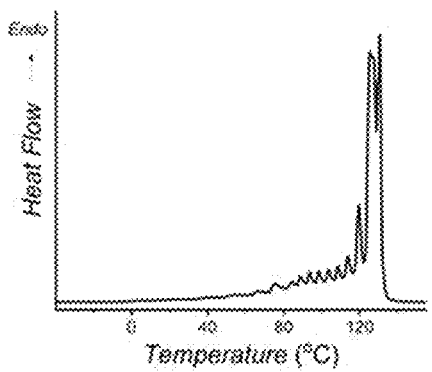
Example 2
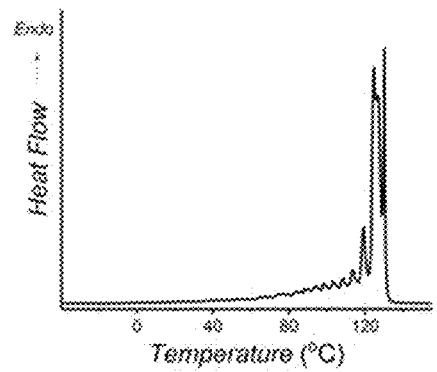
Example 3
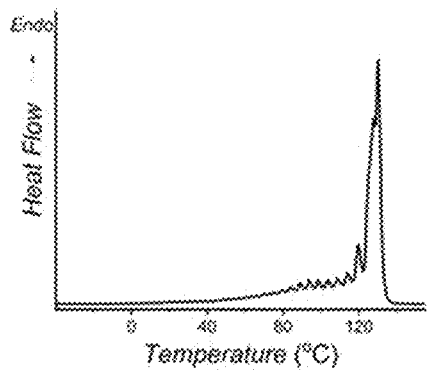
Example 4
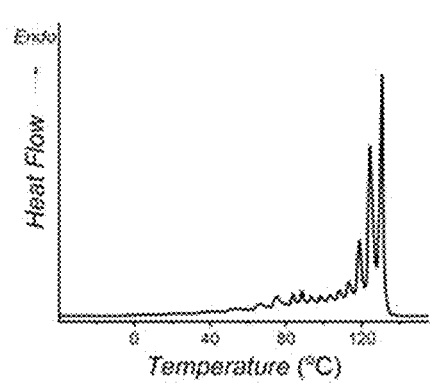

[FIG. 3]
Comparative Example 1
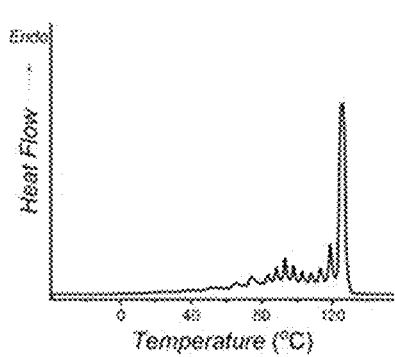
Comparative Example 2
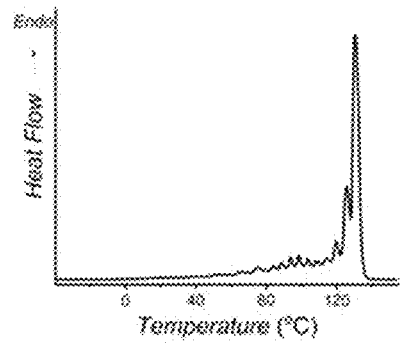
Comparative Example 3
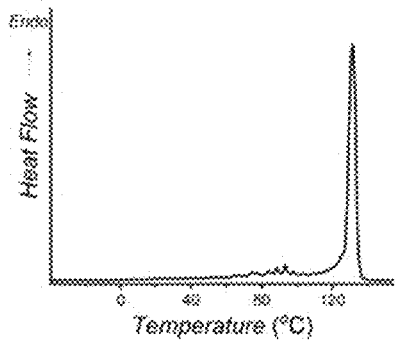
Comparative Example 4
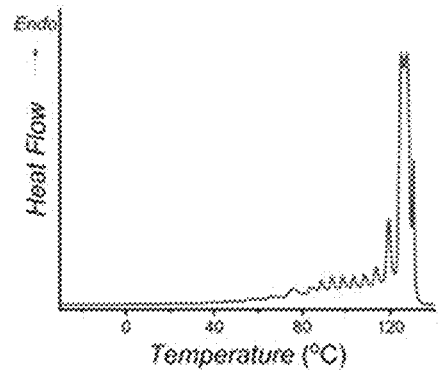

POLYETHYLENE COMPOSITION AND BIAXIALLY STRETCHED FILM COMPRISING SAME

CROSS-REFERENCE TO RELATED APPLICATION

This application claims priority to and the benefit of Korean Patent Application No. 10-2024-0039384, filed on Mar. 21, 2024, the disclosure of which is incorporated herein by reference in its entirety.

TECHNICAL FIELD

The present disclosure relates to a polyethylene composition suitable for manufacturing a biaxially stretched film having high shrinkage resistance, printability and transparency, while maintaining excellent mechanical properties.

In addition, the present disclosure relates to a biaxially stretched film having high shrinkage resistance, printability and transparency, while maintaining excellent mechanical properties.

BACKGROUND

A linear low density polyethylene (LLDPE) film and a high density polyethylene (HDPE) film, which are thin films manufactured from LLDPE and HDPE, are used for various purposes. Specifically, they are widely used as a sealing layer of a packaging film used for packaging purposes such as product bags, grocery bags, food and special packaging, and industrial liners.

A packaging film formed with a printing layer and a sealing layer enables packaging of a product while maintaining a shape of the product, and may perform a function of protecting a product from external stimuli during product display.

Among various packaging films, a biaxially stretched film having characteristics such as excellent mechanical properties, productivity and printability is widely used for packaging purposes.

More specifically, commercialized packaging films generally use BOPP (biaxially-oriented polypropylene), BOPET (biaxially-oriented polyethylene terephthalate) or BOPA (biaxially-oriented polyamide) for the printing layer, and an LLDPE film or HDPE film for the sealing layer. However, this form of using composite materials has a problem in that it is impossible to recycle a packaging film due to the type of film used for the printing layer.

In order to resolve this problem, research and development for manufacturing a single-material packaging film in which a film of the printing layer is replaced with a biaxially-oriented polyethylene (BOPE) film is ongoing.

However, a commercialized polyethylene (PE) resin used for manufacturing a biaxially-oriented polyethylene (BOPE) film does not have sufficient stretching stability and causes phenomena such as fracture and melting during stretching, making it difficult to apply the resin to a process for biaxial stretching.

Development of a product in a form of a polyethylene composition including a resin having low density and high melt index is being conducted in order to secure stretching stability. However, such a composition exhibits low rigidity, shrinkage, impact resistance and the like, and thus is not suitable to be used for a biaxially stretched film.

Accordingly, there is a need for a polyethylene composition for biaxial stretching having outstanding film mechanical properties while having stretching stability during biaxial stretching.

SUMMARY

The present disclosure is directed to providing a polyethylene composition capable of manufacturing a biaxially stretched film having high shrinkage resistance, printability and transparency, while maintaining excellent mechanical properties, productivity and stretching stability.

In addition, the present disclosure is directed to providing a biaxially stretched film having high shrinkage resistance, printability and transparency, while maintaining excellent mechanical properties, productivity and stretching stability.

One aspect of the present disclosure provides a polyethylene composition including one or more types of ethylene-alpha-olefin copolymers, wherein, in the polyethylene composition, a successive self-nucleation and annealing (SSA) thermogram representing a relationship between heat flow and temperature satisfies the following Equation 1.

$$0.16 \leq B/A \leq 0.4 \qquad \text{[Equation 1]}$$

In Equation 1,

A means an area for an entire temperature region in the SSA thermogram, and

B means an area for a temperature region of 128° C. or higher in the SSA thermogram.

In addition, one aspect of the present disclosure provides a biaxially stretched film including the polyethylene composition according to the present disclosure.

BRIEF DESCRIPTION OF THE DRAWINGS

FIG. 1 is an SSA thermogram of a polyethylene composition according to one aspect of the present disclosure, and indicates a meaning of an area for a temperature region of 128° C. or higher.

FIGS. 2 and 3 are SSA thermograms derived from polyethylene compositions of Examples 1 to 4 and Comparative Examples 1 to 4 of the present disclosure.

DETAILED DESCRIPTION

Unless otherwise defined in the present specification, all technical terms and scientific terms are used for describing illustrative aspects only and are not intended to limit the present disclosure. In addition, singular forms include plural forms as well, unless the context clearly indicates otherwise.

In the present specification, terms such as "include (comprise)", "provide" or "have" are to specify the presence of features, numbers, steps, constituents or combinations thereof implemented, and need to be construed as not excluding the possibility of presence or addition of one or more of other features, numbers, steps, constituents or combinations thereof in advance.

The present disclosure may have various modifications, and may have various forms, and specific aspects will be illustrated and described in detail below. However, this is not intended to limit the present disclosure to a specific disclosed form, and needs to be understood to include all modifications, equivalents and substitutes included in the idea and the technical scope.

Terminology used in the present specification is for describing a specific aspect only, and is not intended to limit the present disclosure. Singular forms used herein also include plural forms unless the phrases clearly indicate otherwise.

Terms "about", "substantially" and the like representing the sense of degree used throughout the present specification are, when manufacturing and material tolerances inherent to the described meaning are presented, used to mean at or near the numerical values, and are used to prevent unscrupulous infringers from unfairly exploiting the disclosure in which exact or absolute numerical values are mentioned to help understand the present application.

In addition, in the present specification, a (co) polymer has a meaning including both a homo-polymer and a co-polymer.

Unless otherwise defined in the present specification, "copolymerization" may mean block copolymerization, random copolymerization, graft copolymerization or alternating copolymerization, and a "copolymer" may mean a block copolymer, a random copolymer, a graft copolymer or an alternating copolymer.

In the present specification, "parts by weight" means a relative concept in which a weight of remaining substances is expressed as a ratio based on a weight of a certain substance. For example, in a mixture including substance A having a weight of 50 g, substance B having a weight of 20 g and substance C having a weight of 30 g, the amounts of substance B and substance C are 40 parts by weight and 60 parts by weight, respectively, based on 100 parts by weight of substance A.

Meanwhile, "% by weight" means an absolute concept representing a weight of a certain substance in the total weight as a percentage. In the mixture of the above-mentioned example, the amounts of substance A, substance B and substance C are 50% by weight, 20% by weight and 30% by weight, respectively, in 100% of the total weight of the mixture.

In the present specification, 'a to b' means a or greater, and b or less.

In the present specification, 'a, b, c or d' means a, or b, or c, or d.

Hereinafter, a polyethylene composition according to specific aspects of the present disclosure and a biaxially stretched film including the same will be described in detail.

I. Polyethylene Composition

A polyethylene composition of the present disclosure is characterized in that an area ratio of an SSA (successive self-nucleation and annealing) thermogram derived by an SSA analysis is controlled to satisfy Equation 1.

When a polyethylene composition is rapidly cooled and then slowly annealed at a specific temperature, a stable lamellar is crystallized, and an unstable lamellar remains in a melted state. Herein, the lamellar refers to a plate-shaped structure formed by gathering polymer chains folded to regularly arrange a long polymer chain in a narrow space. The lamellar may also be referred to as a layered structure.

The SSA analysis is an analysis method of measuring changes occurring while repeating a phenomenon in which a stable lamellar is crystallized and an unstable lamellar remains in a melted state during annealing in a stepwise manner using a differential scanning calorimeter (DSC).

In addition, the SSA thermogram means expressing the result of SSA analysis as a graph in which the x axis is a temperature and the y axis is heat flow.

More specifically, the SSA analysis and the SSA thermogram are derived through the following steps.

Step 1) Stepwise Annealing

① (Heating) A polyolefin composition at room temperature (approximately 25° C.) is heated to a set heating temperature. At this time, the heating temperature is adjusted during repeated cycles as described below. Specifically, the polyolefin composition is heated for 15 minutes to 25 minutes after setting a first heating temperature at 175° C. to 185° C.

② (Rapid cooling) Then, the polyolefin composition at the first heating temperature is cooled (rapidly cooled) at a rate of 15° C./min to 25° C./min (first cooling rate) for 1.5 minutes to 2 minutes (first cooling time) until the temperature of the polyolefin composition reaches 140° C. to 150° C. (rapid cooling temperature). And then the corresponding temperature is maintained for 15 minutes to 25 minutes.

③ (Cooling) Additionally, the polyolefin composition, which has reached the rapid cooling temperature, is cooled at a rate of 5° C./min to 10° C./min (second cooling rate) for 10 minutes to 25 minutes (second cooling time) until the temperature of the polyolefin composition reaches 25° C. to 35° C. Thereafter, the temperature is maintained for 1 minute to 10 minutes. The polyolefin composition is cooled to 25° C. to 35° C., and then kept for 0.5 minutes to 1.5 minutes.

④ Then, the processes of heating, rapid cooling, and cooling are repeated for the polyolefin composition described above, except that the $(n+1)^{th}$ heating temperature is set 3° C. to 7° C. lower than the $n^{th}$ heating temperature. Specifically, the processes of heating, rapid cooling, and cooling are repeated for the polyolefin composition until the $(n+1)^{th}$ heating temperature is set to 55° C. to 70° C. Furthermore, in this process, the heating temperature corresponds to the $(n+1)^{th}$ heating temperature, and the first cooling rate and first cooling time in the rapid cooling stage, as well as the second cooling rate and second cooling time in the cooling stage, remain the same.

⑤ When the $(n+1)^{th}$ heating temperature is set to 55° C. to 70° C., the $(n+2)^{th}$ heating temperature is lowered by 7° C. to 13° C. compared to the $(n+1)^{th}$ heating temperature, and the processes of heating, rapid cooling, and cooling are repeated for the polyolefin composition. In other words, the degree of reduction in the heating temperature is adjusted. Specifically, after the $(n+1)^{th}$ heating temperature is set to 55° C. to 70° C., the processes of heating, rapid cooling, and cooling are repeated for the polyolefin composition until the $(n+2)^{th}$ heating temperature is set to 35° C. to 45° C. In this process, the heating temperature corresponds to the $(n+2)^{th}$ heating temperature, and the first cooling rate and first cooling time in the rapid cooling stage, as well as the second cooling rate and second cooling time in the cooling stage, remain the same.

Step 2) Deriving SSA Thermogram

① After cooling the polyolefin composition to 25° C. to 35° C. in the final annealing step, the temperature of the polyolefin composition maintained for 1 minutes to 10 minutes is lowered to −55° C. to −45° C.

② While heating the polyolefin composition, which is cooled to −55° C. to −45° C., to 175° C. to 185° C. at a rate of 7° C./min to 13° C./min (heating rate), an SSA thermogram as shown in FIG. 1 is derived.

The SSA analysis process includes both the steps 1 and 2, and changes in the steps 1 and 2 may be measured using a differential scanning calorimeter (DSC). In addition, the temperature and time ranges described in the steps 1 and 2 are ranges that are set considering allowable errors.

Step 3) Obtaining Area Ratio (C)

In the SSA thermogram, the temperature region where the lamellar peak does not appear is set as a baseline, and areas for the entire temperature region and the temperature region of 128° C. or higher are obtained.

Then, using the following Calculation Formula 1, C, which is the ratio of the area for the temperature region of 128° C. or higher with respect to the area for the entire temperature region, is obtained.

$$C = B/A \qquad \text{[Calculation Formula 1]}$$

In Calculation Formula 1,
A means the area for the entire temperature region in the SSA thermogram, and
B means the area for the temperature region of 128° C. or higher in the SSA thermogram.

The polyolefin composition according to the present disclosure satisfies the following Equation 1.

$$0.16 \leq B/A \leq 0.4 \qquad \text{[Equation 1]}$$

In Equation 1,
A means the area for the entire temperature region in the SSA thermogram, and
B means the area for the temperature region of 128° C. or higher in the SSA thermogram.

A and B mean areas calculated by setting the temperature region where the lamellar peak does not appear in the SSA thermogram derived through the SSA analysis as a baseline. In other words, as may be identified in FIG. 1 showing an example of the SSA thermogram, the present disclosure is characterized in that the ratio of the area for the temperature region of 128° C. or higher with respect to the area for the entire temperature region satisfies Equation 1.

The 128° C. is a temperature including the last observed peak in the SSA analysis result, and the temperature region of 128° C. or higher means a ratio of the longest ethylene sequence. The lamellar peak means a peak shown in the SSA thermogram.

The polyolefin composition of the present disclosure is a semi-crystalline polymer composition, and may include a crystalline portion and an amorphous portion. Specifically, the crystalline portion forms a bundle while a polymer chain including an ethylene repeating unit is folded, and through this, a crystalline block (or segment) in a lamellar shape may be formed. Typically, a crystal structure of polyethylene needs to be properly controlled in order to provide a polyethylene composition for manufacturing a biaxially stretched film having high shrinkage resistance, printability and transparency, while maintaining excellent mechanical properties, productivity and stretching stability.

A polyethylene crystal structure is affected by length distribution of an ethylene repeating unit forming a lamellar crystal. In other words, properties of a polyethylene film may greatly vary depending on the ratio between a polymer chain having a long ethylene repeating unit and a polymer chain having a short ethylene repeating unit among polymer chains forming a lamellar crystal.

In the polyethylene crystal structure, the ethylene repeating unit in the polymer chain forming a lamellar crystal is referred to as an ethylene sequence. The polyolefin composition includes ethylene repeating units of various lengths, that is, ethylene sequences of various lengths. In addition, length distribution of an ethylene sequence in the polyethylene composition, that is, in which ratio a long ethylene sequence and a short ethylene sequence are distributed may affect the crystal structure of polyethylene.

The length distribution of ethylene sequence may be controlled by controlling polyethylene polydispersity (PDI) and a molecular structure such as a short chain branch (SCB) in the polyethylene composition.

When a ratio of a long ethylene sequence having a certain length or greater is present in a proper range, a polyethylene composition with improved stretching stability and properties may be obtained during biaxial stretching. In other words, when a ratio of a long ethylene sequence having a certain length or greater is too high, the content of crystal from which polyethylene is melted is low at the stretched temperature, resulting in low flexibility, and therefore, high-magnification stretching may be difficult.

In addition, when a ratio of a long ethylene sequence having a certain length or greater is too low, the ratio of thick crystals is low, making it difficult to maintain a crystal form, thereby leading to a problem of reduced processability.

The ethylene sequence having a long length described above may mean that the number of ethylene repeating units forming a lamellar crystal is large, and thus the thickness of the lamellar crystal is larger as well. In other words, the polyethylene composition having a long ethylene sequence may form a thick lamellar. In other words, it may be said that the lamellar thickness is proportional to the length of the ethylene sequence, and therefore, the length distribution of ethylene sequence may be predicted through the distribution of lamellar thickness of the polyethylene composition.

As described above, the distribution of lamellar thickness may be identified through an SSA analysis, and therefore, the length distribution of ethylene sequence may also be predicted when performing an SSA analysis.

When the area in the temperature region of 128° C. or higher has a specific range value with respect to the area in the entire temperature region through the SSA thermogram in the polyethylene composition, that is, when Equation 1 is satisfied in the SSA thermogram, a biaxially stretched film having high shrinkage resistance, printability and transparency while maintaining excellent mechanical properties, productivity and stretching stability may be obtained.

The polyethylene composition satisfying Equation 1 means that a thick lamellar is included at a certain level in the polyethylene composition, and this may mean that an ethylene sequence having a certain length or greater is included at a proper level.

The area in the temperature region of 128° C. or higher in the SSA thermogram means that there are many ethylene sequences capable of forming a thick lamellar, which indicates a long ethylene sequence. In other words, the temperature region of 128° C. or higher means the ratio of long ethylene sequence. In other words, it may be said that the ratio of the area in the temperature region of 128° C. or higher to the total area means a ratio of long ethylene sequence in the total ethylene sequences, and the ratio of long ethylene sequence capable of forming a thick lamellar affects mechanical properties, an important factor in manufacturing a polyethylene stretched film.

The type and the content of polyethylene in the polyethylene composition may be controlled to satisfy Equation 1.

The B/A of Equation 1 may be 0.16 or greater and 0.4 or less, or 0.16 or greater and 0.35 or less, or 0.16 or greater and 0.31 or less.

The polyethylene composition satisfying the above-mentioned range is suitable for manufacturing a biaxially stretched film having high shrinkage resistance, printability and transparency while maintaining mechanical properties, productivity and stretching stability that are equivalent or superior to those in the related art, by controlling a balance between mechanical properties and stretchability through blending a first ethylene-alpha-olefin copolymer capable of providing stretchability by having excellent flowability and a second ethylene-alpha-olefin copolymer having excellent mechanical properties by each applying a specific metallocene catalyst to be described later.

The polyethylene composition may have density of 0.925 g/cm$^3$ to 0.950 g/cm$^3$, 0.925 g/cm$^3$ to 0.940 g/cm$^3$, or 0.925 g/cm$^3$ to 0.938 g/cm$^3$. The density may be 0.925 g/cm$^3$ or greater, or 0.926 g/cm$^3$ or greater, and 0.950 g/cm$^3$ or less, 0.940 g/cm$^3$ or less or 0.938 g/cm$^3$ or less.

In the present specification, the density (g/cm$^3$) may be measured using a density gradient tube in accordance with the ASTM D 1505 standard of the American Society for Testing and Materials.

The polyethylene composition may have a melt index (MI2.16, 190° C., 2.16 kg load) of 0.1 g/10 min to 3.0 g/10 min. The melt index (MI2.16, 190° C., 2.16 kg load) may be 0.1 g/10 min or greater, 0.2 g/10 min or greater, 0.3 g/10 min or greater or 0.35 g/10 min or greater, and 3.0 g/10 min or less, 2.8 g/10 min or less, 2.6 g/10 min or less or 2.4 g/10 min or less.

The melt index (MI2.16) may be measured under a load of 2.16 kg at 190° C. in accordance with the ASTM D1238 standard (condition E, 190° C., 2.16 kg) of the American Society for Testing and Materials.

The polyethylene composition may have a number average molecular weight Mn of 16,000 g/mol or greater. The number average molecular weight Mn may be 16,000 g/mol or greater and 500,000 g/mol or less, 16,000 g/mol or greater and 300,000 g/mol or less, or 16,000 g/mol or greater and 50,000 g/mol or less.

The polyethylene composition may have a weight average molecular weight Mw of 80,000 g/mol or greater. The weight average molecular weight Mw may be 80,000 g/mol or greater and 1,000,000 g/mol or less, 80,000 g/mol or greater and 800,000 g/mol or less, or 85,000 g/mol or greater and 200,000 g/mol or less.

In addition, the polyethylene composition may have molecular weight distribution Mw/Mn of 10.0 or less. The polyethylene composition may have molecular weight distribution Mw/Mn of 9.8 or less, 9.5 or less, 9.3 or less, 9.0 or less or 8.8 or less. In addition, the molecular weight distribution Mw/Mn may be 0.5 or greater, 1.0 or greater, 1.2 or greater, 1.5 or greater, 1.8 or greater, 2.0 or greater, 2.5 or greater, 2.8 or greater, 3.0 or greater or 3.2 or greater.

The weight average molecular weight (Mw) and the number average molecular weight (Mn) described above are converted values for standard polystyrene measured using gel permeation chromatography (GPC).

As a specific example, the weight average molecular weight (Mw) and the number average molecular weight (Mn) of the polyethylene composition may be measured in accordance with the ASTM D 6474 standard of the American Society for Testing and Materials using gel permeation chromatography (GPC, manufactured by Waters). Specifically, as the gel permeation chromatography (GPC) device, a Waters PL-GPC220 device may be used, and a Polymer Laboratories PLgel MIX-B 300 mm length column may be used. Herein, the measurement temperature is 160° C., 1,2,4-trichlorobenzene may be used as a solvent, and a flow rate of 1 mL/min may be applied. The sample of the polyethylene composition may be pretreated by being melted for 10 hours at 160° C. in 1,2,4-trichlorobenzene including 0.0125% of BHT using a GPC analysis device (PL-GP220), then prepared at a concentration of 10 mg/10 mL, and then supplied in an amount of 200 μL. Herein, the Mw and the Mn values may be induced using a calibration curve formed using a polystyrene standard specimen. 9 types of the polystyrene standard specimen having a weight average molecular weight of 2,000 g/mol, 10,000 g/mol, 30,000 g/mol, 70,000 g/mol, 200,000 g/mol, 700,000 g/mol, 2,000,000 g/mol, 4,000,000 g/mol and 10,000,000 g/mol may be used.

The polyethylene composition may have a melting point Tm of 125° C. to 129° C., a crystallization temperature Tc of 110° C. to 115° C., and crystallinity Xc of 35% to 48%.

Such a melting point Tm, crystallization temperature Tc and crystallinity Xc may be measured using a differential scanning calorimeter (DSC).

As a specific example, the melting point Tm, the crystallization temperature Tc and the crystallinity Xc of the polyethylene composition may be measured using a differential scanning calorimeter device (DSC, device name: DSC Q20, manufacturer: TA instrument). First, the temperature is raised to heat the polyethylene composition sample to 180° C. at 10° C./min (Cycle 1), and then maintained (isothermal) at 180° C. for 5 minutes, then lowered to 0° C. at 10° C./min, then maintained (isothermal) for 5 minutes at 30° C., and then raised again to 180° C. at 10° C./min (Cycle 2). In the DSC curve obtained therethrough, the temperature at the maximum point of the endothermic peak is measured as the melting temperature (Tm, ° C.), and the temperature of the maximum point of the exothermic peak is measured as the crystallization temperature (Tc, ° C.). Herein, the melting temperature (Tm) and the crystallization temperature (Tc) are expressed as the results measured in the sections where the second temperature increases and decreases, respectively (Cycle 2).

In addition, heat of fusion ΔHm is obtained as the area of the melting peak in the section where the second temperature increases (Cycle 2), and this value is divided by H°m=293.6 J/g, a theoretical value when crystallinity is 100%, to obtain the crystallinity (Xc, %).

The polyethylene composition includes a first ethylene-alpha-olefin copolymer and a second ethylene-alpha-olefin copolymer, and a polyethylene composition satisfying Equation 1 may be provided.

For this, the polyethylene composition according to the present disclosure may include the (a) first ethylene-alpha-olefin copolymer in an amount of greater than 0% by weight and 40% by weight or less, and the (b) second ethylene-alpha-olefin copolymer in an amount of 60% by weight or greater and less than 100% by weight.

The (a) first ethylene-alpha-olefin copolymer may be included in an amount of 5% by weight or greater, 10% by weight or greater or 15% by weight or greater, and 38% by weight or less, 35% by weight or less or 30% by weight or less.

In addition, the (b) second ethylene-alpha-olefin copolymer may be included in an amount of 62% by weight or greater, 65% by weight or greater or 70% by weight or greater, and 85% by weight or less, 90% by weight or less or 95% by weight or less.

By combining the first and the second ethylene-alpha-olefin copolymers in proper amounts as described above, the composition of one aspect satisfies a proper crystal structure and the like to satisfy Equation 1, and as a result, excellent overall properties described above may be satisfied.

In addition, in the polyethylene composition, the first and the second ethylene-alpha-olefin copolymers may each be a copolymer of ethylene and alpha-olefin having 3 to 20 carbon atoms, and in a more specific example, may be a copolymer of ethylene and 1-butene, 1-hexene or 1-octene. In a specific example, these first and second ethylene-alpha-olefin copolymers may be polymers that are the same as or different from each other, and for example, the (a) first ethylene-alpha-olefin copolymer may be an ethylene/1- octene copolymer and the (b) second ethylene-alpha-olefin copolymer may be an ethylene/1-hexene copolymer. However, the first and the second ethylene-alpha-olefin copolymers are not limited thereto, and combinations satisfying Equation 1 may be used.

(a) First Ethylene-Alpha-Olefin Copolymer

The (a) first ethylene-alpha-olefin copolymer has density of 0.870 g/cm³ to 0.920 g/cm³, and a melt index (MI2.16, 190° C., 2.16 kg load) of 3.0 g/10 min to 10.0 g/10 min. The (a) first ethylene-alpha-olefin copolymer may have density of 0.880 g/cm³ or greater, 0.890 g/cm³ or greater or 0.895 g/cm³ or greater, and 0.915 g/cm³ or less, 0.910 g/cm³ or less or 0.905 g/cm³ or less.

In addition, the (a) first ethylene-alpha-olefin copolymer may have a melt index (MI2.16, 190° C., 2.16 kg load) of 3.5 g/10 min or greater, 4.0 g/10 min or greater or 4.5 g/10 min or greater, and 9.0 g/10 min or less, 8.0 g/10 min or less or 7.0 g/10 min or less.

In other words, the (a) first ethylene-alpha-olefin copolymer has excellent stretching stability and high shrinkage resistance by having excellent flowability, and a polyethylene composition including the same may have characteristics suitable for manufacturing a biaxially stretched film.

the (a) first ethylene-alpha-olefin copolymer may have a number average molecular weight Mn of 20,000 g/mol or greater and 35,000 g/mol or less, a weight average molecular weight Mw of 60,000 g/mol or greater and less than 95,000 g/mol, and molecular weight distribution Mw/Mn of 2.0 or greater and less than 3.5.

The (a) first ethylene-alpha-olefin copolymer may have a number average molecular weight Mn of 22,000 g/mol or greater, 25,000 g/mol or greater or 28,000 g/mol or greater, and 34,000 g/mol or less, 33,000 g/mol or less or 32,000 g/mol or less.

In addition, the (a) first ethylene-alpha-olefin copolymer may have a weight average molecular weight Mw of 62,000 g/mol or greater, 64,000 g/mol or greater or 65,000 g/mol or greater, and 90,000 g/mol or less, 80,000 g/mol or less or 70,000 g/mol or less.

In addition, the (a) first ethylene-alpha-olefin copolymer may have molecular weight distribution Mw/Mn of 2.1 or greater, 2.2 or greater or 2.3 or greater, and 3.2 or less, 3.0 or less, 2.8 or less or 2.5 or less.

The (a) first ethylene-alpha-olefin copolymer may have at least any one of the above-described properties, and may have all of the above-described properties in order to exhibit excellent mechanical strength.

Herein, methods for measuring each of the properties of the (a) first ethylene-alpha-olefin copolymer are the same as the methods described for the polyethylene composition, and therefore, specific description thereon will not be included.

Meanwhile, the (a) first ethylene-alpha-olefin copolymer may include, together with ethylene, one or more types of alpha-olefins selected from the group consisting of 1-butene, 1-pentene, 1-hexene, 4-methyl-1-pentene, 1-octene, 1-decene, 1-dodecene, 1-tetradecene, 1-hexadecene, 1-octadecene, 1-eicosene and mixtures thereof.

In addition, the (a) first ethylene-alpha-olefin copolymer may be an ethylene/1-octene copolymer.

When the (a) first ethylene-alpha-olefin copolymer is the copolymer described above, the properties described above may be more readily obtained. However, the type of (a) first ethylene-alpha-olefin copolymer is not limited to the above-described types, and various types known in the technical field to which the present disclosure belongs may be provided as long as the above-described properties are obtained.

Meanwhile, the (a) first ethylene-alpha-olefin copolymer having the above-mentioned property characteristics may be prepared in the presence of a metallocene catalyst.

Specifically, the (a) first ethylene-alpha-olefin copolymer may be prepared by copolymerizing ethylene and a comonomer in the presence of a catalyst composition including a first metallocene compound represented by one of the following structural formulae.

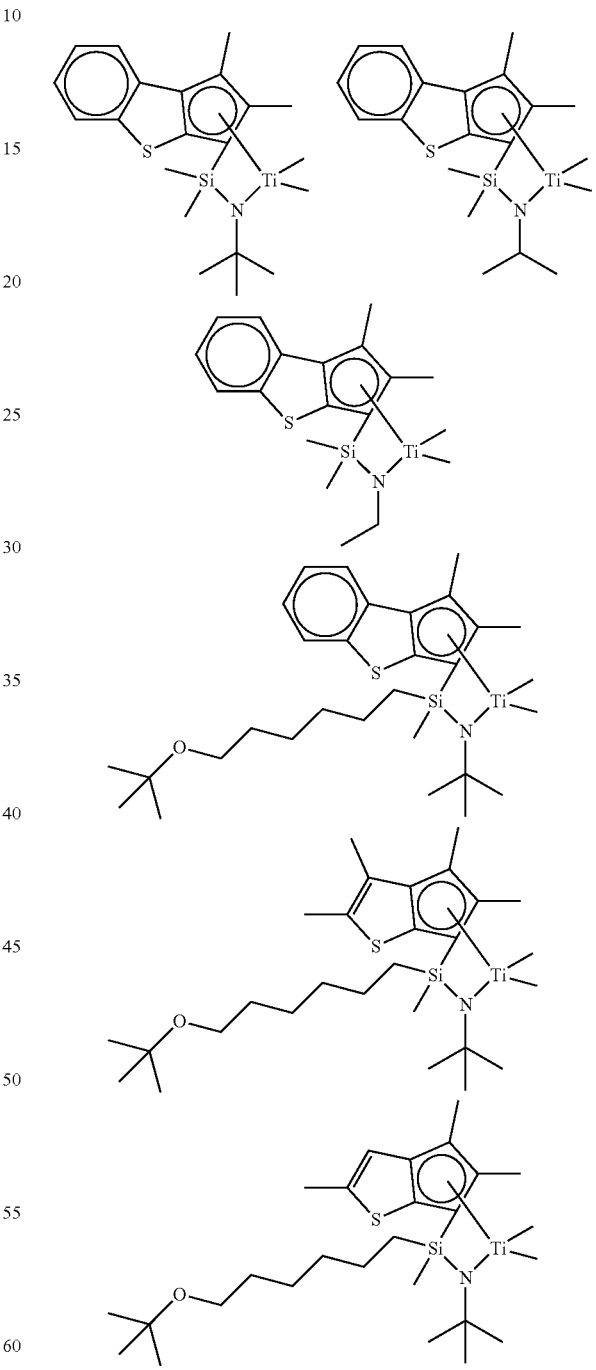

The first metallocene compound represented by the structural formulae may be synthesized by applying known reactions, and Examples and Synthesis Examples to be described later may be referred to for more detailed synthesis methods.

When the first metallocene compound is used, the degree of alpha-olefin-based monomer introduction may be controlled in the copolymerization process due to structural characteristics of the catalyst. Through this, density and the like of the first ethylene-alpha-olefin copolymer satisfy the above-described ranges, and as a result, excellent flowability and stretch processability may be secured.

In the present disclosure, the polymerization reaction may be performed by continuously introducing hydrogen in the presence of a catalyst composition including one or more types of the first metallocene compound to continuously polymerize ethylene and an alpha-olefin-based monomer. Herein, the continuous polymerization reaction may be performed while introducing hydrogen at 5 cc/min to 100 cc/min.

The hydrogen gas suppresses a rapid reaction of the transition metal compound at the beginning of the polymerization, and performs a role of terminating the polymerization reaction. Accordingly, an ethylene/alpha-olefin copolymer having narrow molecular weight distribution may be effectively prepared by using the hydrogen gas and controlling the used amount of the hydrogen gas.

For example, the hydrogen may be introduced at 5 cc/min or greater, 7 cc/min or greater, 10 cc/min or greater, 15 cc/min or greater or 19 cc/min or greater, and may be introduced at 100 cc/min or less, 50 cc/min or less, 45 cc/min or less, 35 cc/min or less or 29 cc/min or less. When the hydrogen is introduced under the above-mentioned condition, the prepared ethylene/alpha-olefin copolymer may have the above-described property characteristics.

When the hydrogen gas is introduced at less than 5 cc/min, the polymerization reaction is not uniformly terminated, making it difficult to prepare an ethylene/alpha-olefin copolymer having desired properties, and when introduced at greater than 100 cc/min, the termination reaction occurs too quickly, causing a concern of preparing an ethylene/alpha-olefin copolymer having a very small molecular weight.

In addition, the continuous polymerization reaction may be performed at 100° C. to 200° C., and by controlling the polymerization temperature together with the introduced amount of hydrogen described above, crystallinity distribution and molecular weight distribution in the ethylene/alpha-olefin copolymer may be more readily controlled. Specifically, the polymerization reaction may be performed at 100° C. to 200° C., 120° C. to 180° C., 130° C. to 170° C. or 140° C. to 160° C., however, the temperature is not limited thereto.

In the present disclosure, a cocatalyst may be additionally used in the catalyst composition in order to activate the first metallocene compound. The cocatalyst may be an organometallic compound including a Group 13 metal.

More specifically, the cocatalyst may be an alkylaluminoxane-based compound in which repeating units are bonded in a linear, circular or network shape, and specific examples thereof may include methylaluminoxane (MAO), ethylaluminoxane, isobutylaluminoxane, tert-butylaluminoxane or the like. These correspond to examples, and the cocatalyst is not limited thereto. These cocatalysts may function as an alkylating agent and an activating agent.

In addition, the cocatalyst may be trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide or dimethylaluminum ethoxide. These correspond to examples, and the cocatalyst is not limited thereto. These cocatalysts may function as an alkylating agent.

Lastly, the cocatalyst may be trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-dimethyl-2,4,6-trimethylanilinium tetrakis(pentafluorophenyl)borate, trimethylammoniumtetrakis(2,3,4,6-tetrafluorophenyl)borate, N,N-dimethylaniliniumtetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi (dodecyl) ammonium tetrakis(pentafluorophenyl)borate. These correspond to examples, and the cocatalyst is not limited thereto. These cocatalysts may function as an activating agent.

The content of the cocatalyst used may be properly controlled depending on the intended properties or effects of the hybrid supported metallocene catalyst.

The cocatalyst may be used in a proper amount so that activation of the first metallocene compound, a transition metal compound, may sufficiently proceed. The content of the cocatalyst used may be properly controlled depending on the intended properties or effects of the hybrid supported metallocene catalyst.

In the present disclosure, the first metallocene compound may be used in a form of being supported on a carrier.

When the first metallocene compound is supported on a carrier, the first metallocene compound and the carrier may have a weight ratio of 1:10 to 1:1,000, and more specifically 1:10 to 1:500. When the carrier and the first metallocene compound, a transition metal compound, are included in the weight ratio of the above-mentioned range, an optimal shape may be obtained. In addition, when the cocatalyst is supported on a carrier therewith, the weight ratio of the cocatalyst to the carrier may be 1:1 to 1:100, and more specifically 1:1 to 1:50.

When the cocatalyst and the carrier are included in the above-mentioned weight ratio, catalytic activity may be improved, and the microstructure of the prepared polymer may be optimized.

Meanwhile, silica, alumina, magnesia or a mixture thereof may be used as the carrier, or these materials may also be used while including a hydroxyl group or a siloxane group having high reactivity on the surface by drying these materials at a high temperature to remove moisture from the surface. In addition, the carriers dried at a high temperature may further include oxide, carbonate, sulfate or nitrate components such as $Na_2O$, $K_2CO_3$, $BaSO_4$ or $Mg(NO_3)_2$.

The drying temperature of the carrier may be 200° C. to 800° C., or 300° C. to 600° C., or 300° C. to 400° C. When the drying temperature of the carrier is lower than 200° C., there is too much moisture and the moisture on the surface and the cocatalyst react, and the drying temperature of higher than 800° C. is not preferred since the surface area is reduced as pores on the carrier surface merge, and a hydroxyl group on the surface disappears much, leaving only a siloxane group, thereby reducing the reaction site with the cocatalyst.

In addition, the amount of hydroxyl group on the carrier surface may be 0.1 mmol/g to 10 mmol/g, or 0.5 mmol/g to 5 mmol/g. The amount of hydroxyl group on the carrier surface may be controlled by preparation method and condition for the carrier, or drying conditions such as temperature, time, vacuum or spray drying.

In addition, an organoaluminum compound for removing moisture in the reactor may be further introduced during the polymerization reaction, and the polymerization reaction may proceed in the presence thereof. Specific examples of such an organoaluminum compound may include trialkylaluminum, dialkylaluminum halide, alkylaluminum dihalide, aluminum dialkyl hydride, alkyl aluminum sesquihalide or the like, and more specific examples thereof may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3Al_2Cl_3$ or the like. Such an organoaluminum compound may be continuously introduced to the reactor, and may be introduced in a ratio of about 0.1 moles to 10 moles per 1 kg of a reaction medium introduced to the reactor for proper moisture removal.

In addition, polymerization pressure during the continuous polymerization reaction may be about 1 Kgf/cm$^2$ to about 100 Kgf/cm$^2$, or about 1 Kgf/cm$^2$ to about 50 Kgf/cm$^2$, or about 5 Kgf/cm$^2$ to about 30 Kgf/cm$^2$.

In addition, when the first metallocene compound, a transition metal compound, is used in a form of being supported on a carrier, the first metallocene compound may be dissolved or diluted in an aliphatic hydrocarbon solvent having 5 to 12 carbon atoms such as pentane, hexane, heptane, nonane, decane or isomers thereof, an aromatic hydrocarbon solvent such as toluene or benzene, a hydrocarbon solvent substituted with a chlorine atom such as dichloromethane or chlorobenzene, or the like, to be introduced. The solvent used herein may be used after being treated with a small amount of alkyl aluminum to remove a small amount of water or air functioning as a catalyst poison, or it is also possible to use more cocatalysts.

The (a) first ethylene-alpha-olefin copolymer having the above-mentioned property characteristics may be prepared using the first metallocene catalyst described above.

(b) Second Ethylene-Alpha-Olefin Copolymer

The (b) second ethylene-alpha-olefin copolymer may have density of 0.930 g/cm$^3$ to 0.950 g/cm$^3$, and a melt index (MI2.16, 190° C., 2.16 kg load) of 0.1 g/10 min to 2.0 g/10 min.

The (b) second ethylene-alpha-olefin copolymer may have density of 0.935 g/cm$^3$ or greater, 0.938 g/cm$^3$ or greater or 0.940 g/cm$^3$ or greater, and 0.949 g/cm$^3$ or less or 0.948 g/cm$^3$ or less.

In addition, the (b) second ethylene-alpha-olefin copolymer may have a melt index (MI2.16, 190° C., 2.16 kg load) of 0.15 g/10 min or greater or 0.18 g/10 min or greater, and 1.8 g/10 min or less, 1.5 g/10 min or less, 1.2 g/10 min or less or 0.8 g/10 min or less.

The (b) second ethylene-alpha-olefin copolymer may have a number average molecular weight Mn of 12,000 g/mol or greater and 35,000 g/mol or less, a weight average molecular weight Mw of 80,000 g/mol or greater and 250,000 g/mol or less, and molecular weight distribution Mw/Mn of 3.5 or greater and 14.0 or less.

The (b) second ethylene-alpha-olefin copolymer may have a number average molecular weight Mn of 13,000 g/mol or greater or 15,000 g/mol or greater, and 33,000 g/mol or less, 32,000 g/mol or less or 30,000 g/mol or less.

In addition, the (b) second ethylene-alpha-olefin copolymer may have a weight average molecular weight Mw of 95,000 g/mol or greater, 100,000 g/mol or greater, 105,000 g/mol or greater or 110,000 g/mol or greater, and 240,000 g/mol or less, 230,000 g/mol or less or 220,000 g/mol or less.

In addition, the (b) second ethylene-alpha-olefin copolymer may have molecular weight distribution Mw/Mn of 3.6 or greater, 3.7 or greater, 3.9 or greater or 4.0 or greater, and 13.9 or less, 13.8 or less, 13.7 or less or 13.6 or less.

In other words, the (b) second ethylene-alpha-olefin copolymer has excellent mechanical properties compared to the (a) first ethylene-alpha-olefin copolymer. Accordingly, by controlling a balance between mechanical properties and stretchability characteristics through blending the (a) first ethylene-alpha-olefin copolymer and the (b) second ethylene-alpha-olefin copolymer, characteristics suitable for manufacturing a biaxially stretched film having high shrinkage resistance, printability and transparency while maintaining mechanical properties, productivity and stretching stability that are equivalent or superior to those in the related art may be provided.

The (b) second ethylene-alpha-olefin copolymer may have at least any one of the above-described properties, and may have all of the above-described properties in order to exhibit excellent mechanical strength.

Herein, methods for measuring each of the properties of the (b) second ethylene-alpha-olefin copolymer are the same as the methods described for the polyethylene composition, and therefore, specific description thereon will not be included.

Meanwhile, the (b) second ethylene-alpha-olefin copolymer includes, together with ethylene, one or more types of alpha-olefins selected from the group consisting of 1-butene, 1-pentene, 1-hexene, 4-methyl-1-pentene, 1-octene, 1-decene, 1-dodecene, 1-tetradecene, 1-hexadecene, 1-octadecene, 1-eicosene and mixtures thereof.

In addition, the (b) second ethylene-alpha-olefin copolymer may be an ethylene/1-hexene copolymer.

When the (b) second ethylene-alpha-olefin copolymer is the copolymer described above, the properties described above may be more readily obtained. However, the type of the (b) second ethylene-alpha-olefin copolymer is not limited to the above-described types, and various types known in the technical field to which the present disclosure belongs may be provided as long as the above-described properties are obtained.

The (b) second ethylene-alpha-olefin copolymer is prepared in the presence of a metallocene catalyst.

Specifically, the (b) second ethylene-alpha-olefin copolymer may be prepared by copolymerizing ethylene and a comonomer by introducing hydrogen gas in the presence of a catalyst composition including a second metallocene compound and a third metallocene compound.

The second metallocene compound may be, for example, a compound represented by one of the following structural formulae, but is not limited thereto.

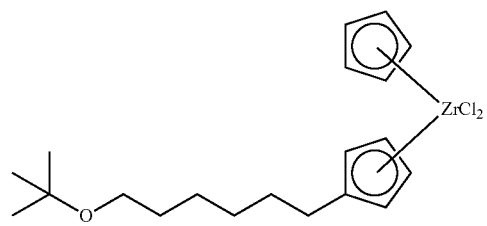

-continued

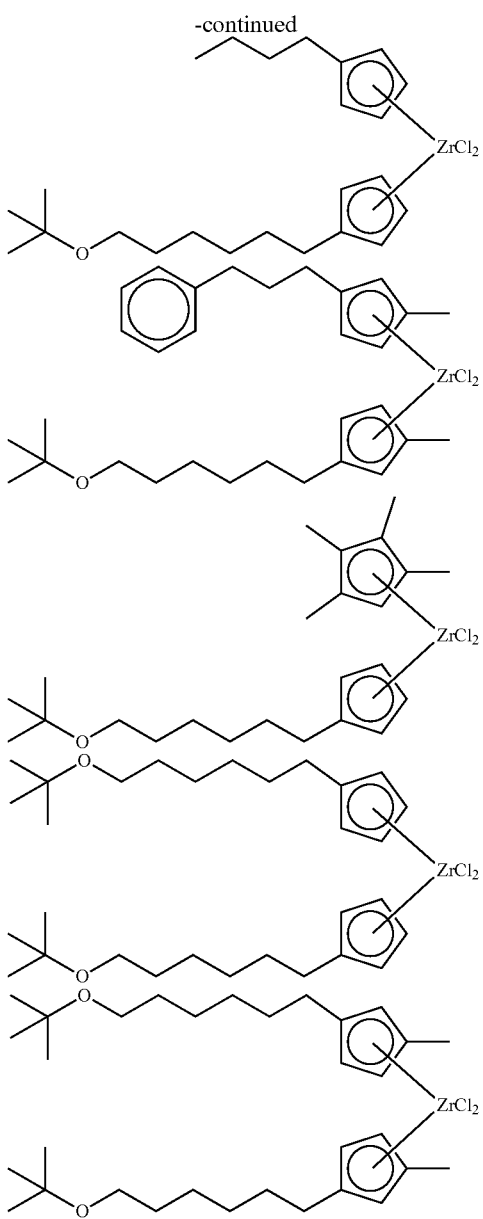

The second metallocene compound represented by the structural formulae may be synthesized by applying known reactions, and Examples may be referred to for more detailed synthesis methods.

The second metallocene compound is a non-crosslinked compound including two ligands corresponding to cyclopentadienyl unsubstituted or substituted with a hydrocarbon having 1 to 20 carbon atoms, and is usually advantageous in producing a low molecular-weight copolymer having a low SCB (short chain branch) content. Specifically, the second metallocene compound may exhibit high polymerization activity since the two ligands have an unshared electron pair that may act as a Lewis base. In addition, since the two ligands are cyclopentadienyl with relatively low steric hindrance, high polymerization activity and low hydrogen reactivity are obtained, and low molecular-weight polyethylene may be polymerized with high activity.

The degree of steric hindrance effect of the second metallocene compound may be controlled depending on the type of substituted functional group, and from this, characteristics such as chemical structure, molecular weight, molecular weight distribution, mechanical properties and transparency of the prepared polyethylene may be readily controlled.

In addition, the third metallocene compound may be any one selected from the group consisting of the following compounds, however, the present disclosure is not limited thereto.

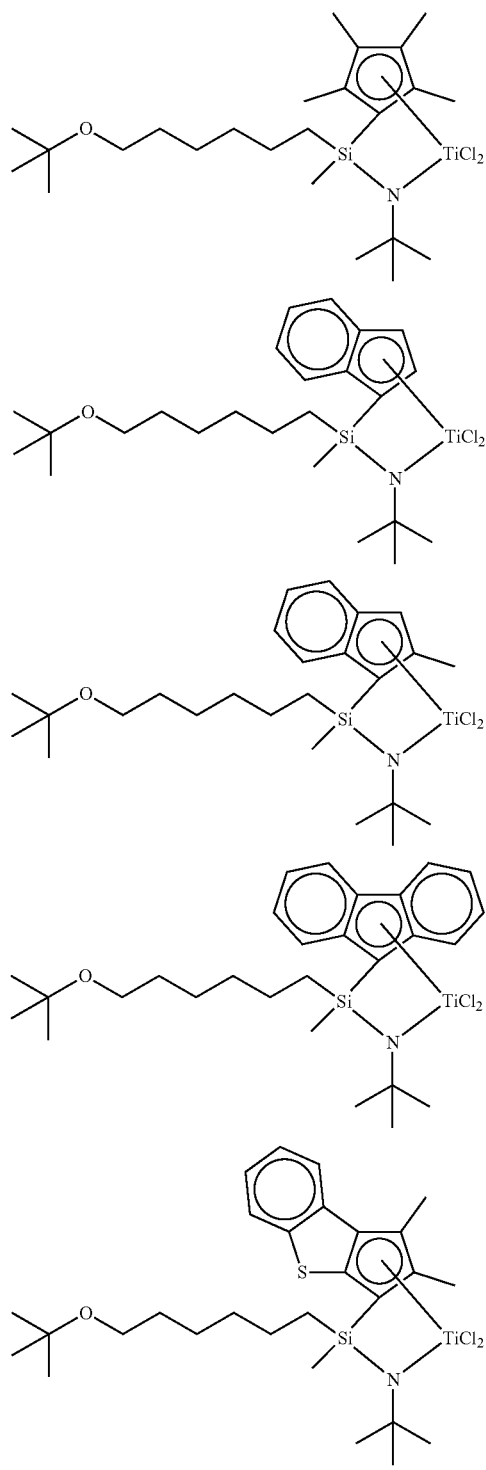

-continued

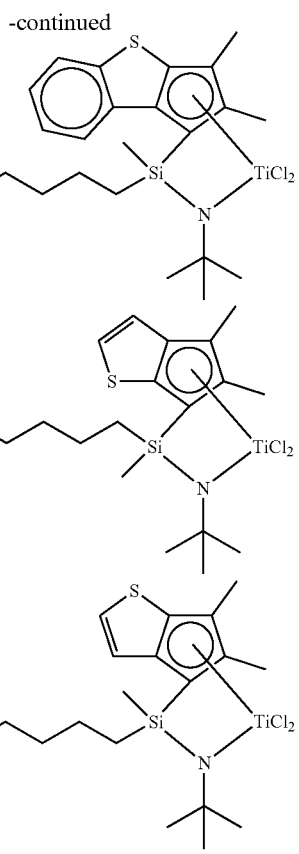

The third metallocene compound represented by the structural formulae may be synthesized by applying known reactions. Specifically, a nitrogen compound and a cyclopentadiene derivative are linked by a bridge compound to prepare a ligand compound, and then metalation is performed thereon after introducing a metal precursor compound thereto to prepare the third metallocene compound. However, the synthesis method is not limited thereto, and Examples may be referred to for more detailed synthesis methods.

A high molecular-weight polyethylene resin having excellent activity may be polymerized from the third metallocene compound. Through this, a polyethylene resin having both excellent long-term stability and processability together with excellent mechanical properties may be provided through a further increased medium to high molecular weight region. Particularly, high polymerization activity is obtained even when supported on a carrier to be used, and an ultra-high molecular-weight polyethylene resin may be prepared.

In addition, even when a polymerization is performed including hydrogen to prepare a polyethylene resin having wide molecular weight distribution as well as high molecular weight, the third metallocene compound exhibits low hydrogen reactivity, and an ultra-high molecular-weight polyethylene resin may still be polymerized with high activity. Accordingly, a polyethylene resin satisfying high molecular weight characteristics without reducing activity may be prepared even when the third metallocene compound is used in combination with catalysts having different characteristics, and therefore, a polyethylene resin having wide molecular weight distribution may be readily prepared while including a high molecular-weight polyethylene resin.

As described above, the second metallocene compound mainly contributes to forming a low molecular weight copolymer having a low SCB content, and the third metallocene compound mainly contributes to forming a high molecular weight copolymer having a high SCB content in the catalyst composition. More specifically, the catalyst composition exhibits low copolymerizability for a comonomer in the copolymer in a low molecular weight region by the second metallocene compound, and exhibits high copolymerizability for a comonomer in the copolymer in a high molecular weight region by the third metallocene compound.

As a result, a polyethylene resin having, as well as excellent mechanical properties, excellent heat resistance due to the bimodal molecular weight distribution may be prepared.

Particularly, the above-mentioned properties may be obtained through controlling a content ratio between the second and third metallocene compounds in the catalyst composition of the present disclosure, and improvement effects resulting therefrom may be further enhanced as well. Specifically, by the third metallocene compound being included in a higher content than the second metallocene compound in the catalyst composition, a medium to high molecular weight region is increased in the molecule, and as a result, a tie molecule fraction ratio may be expanded, entanglement of a polymer chain may be increased, and a ratio between a high molecular weight region and a low molecular weight region may be optimized.

Specifically, the second and third metallocene compounds need to be included in a molar ratio of 1:0.3 to 1:8. The second and third metallocene compounds may be included in a molar ratio of 1:0.5 to 1:7, 1:0.8 to 1:6, or 1:1 to 1:5.5.

Meanwhile, the second and third metallocene compounds may be stably supported on a carrier by having the above-described structural characteristics.

In this case, the second and third metallocene compounds are used while being supported on the carrier. When used in a state of a supported catalyst, the prepared polymer has excellent particle shape and bulk density, and may be suitably used in existing slurry polymerization, bulk polymerization or vapor phase polymerization processes.

Specific examples of the carrier may include silica, alumina, magnesia, silica-alumina, silica-magnesia or the like, and these may commonly further include oxide, carbonate, sulfate or nitrate components such as $Na_2O$, $K_2CO_3$, $BaSO_4$ or $Mg(NO_3)_2$. When using a silica carrier among these, the transition metal compound chemically bonds to a reactive functional group such as a siloxane group present on the surface of the silica carrier to be supported, and therefore, there is almost no catalyst released from the carrier surface in the polymer polymerization process, and as a result, fouling caused by polymer particles sticking with a reactor wall or with each other may be minimized when preparing a polymer through slurry or vapor phase polymerization.

In addition, the carrier may have its surface modified through a calcination or drying process in order to increase support efficiency and minimize leaching and fouling. Through the surface modification step as above, moisture on the carrier surface inhibiting the reaction with support components is removed, and instead, the content of reactive functional groups capable of chemical bonding with support components, such as a hydroxyl group and a siloxane group, may be increased.

Specifically, the calcination or drying process for the carrier may be performed in a range from a temperature at which moisture disappears from the carrier surface to a temperature at which a reactive functional group, particularly a hydroxyl group (OH group), present on the surface completely disappears or lower. Specifically, the temperature may be 150° C. to 600° C. or 200° C. to 500° C. When the temperature during the calcination or drying for the carrier is low, that is, lower than 150° C., moisture removing efficiency is low, which resultantly leads to a concern of reducing support efficiency by the moisture remaining on the carrier reacting with a cocatalyst. On the other hand, when the drying or calcination temperature is excessively high, that is higher than 600° C., the specific surface area is reduced as pores present on the carrier surface merge, and in addition thereto, a reactive functional group such as a hydroxyl group or a silanol group present on the surface disappears much, leaving only a siloxane group, which may lead to a concern of reducing a reaction site with a cocatalyst.

When the second and third metallocene compounds described above are supported on a carrier, and, for example, when the carrier is silica, the second and third metallocene compounds may be supported in a content range of 40 μmol or greater or 80 μmol or greater, and 240 μmol or less or 160 μmol or less as a total amount based on 1 g of silica. When supported in the above-mentioned content range, proper support catalytic activity is obtained, which may be advantageous in terms of maintaining catalyst activity and economic feasibility.

In addition, the catalyst composition may further include a cocatalyst in terms of high activity and improved process stability.

In the hybrid supported metallocene catalyst of the present disclosure, the type and the content of the additionally included cocatalyst are as described above, and specific description thereon will not be included.

For example, among the above-mentioned compounds, the cocatalyst may be more specifically an alkylaluminoxane-based cocatalyst such as methylaluminoxane.

In addition, the alkylaluminoxane-based cocatalyst stabilizes the metallocene compounds, also functions as a Lewis acid, and in addition thereto, may further improve catalytic activity by including a metal element capable of forming a bond with a functional group introduced to a bridge group of the third metallocene compound through a Lewis acid-base interaction.

In addition, the content of the cocatalyst used may be properly controlled depending on the intended properties or effects of the catalyst and resin composition. For example, when silica is used as the carrier, the cocatalyst may be supported in an amount of 8 mmol or greater or 10 mmol or greater, and 25 mmol or less or 20 mmol or less per carrier weight, for example, based on 1 g of silica.

In addition, the catalyst composition described above may be used in polymerization as it is, or may also be used in a state of being pre-polymerized through a contact with an ethylene monomer before being used in a polymerization reaction. In this case, the preparation method according to one aspect of the present disclosure may further include a step of pre-polymerizing the catalyst composition by bringing the catalyst composition into contact with an ethylene monomer before preparing polyethylene through a polymerization reaction.

In addition, the catalyst composition may be dissolved or diluted in an aliphatic hydrocarbon solvent having 5 to 12 carbon atoms such as pentane, hexane, heptane, nonane, decane or isomers thereof, an aromatic hydrocarbon solvent such as toluene or benzene, a hydrocarbon solvent substituted with a chlorine atom such as dichloromethane or chlorobenzene, and the like, to be introduced to a polymerization reaction to be described later.

The solvent used herein may be used after being treated with a small amount of alkyl aluminum to remove a small amount of water or air functioning as a catalyst poison, or it is also possible to use more cocatalysts.

Meanwhile, the polymerization process may be performed by bringing ethylene into contact with a comonomer in the presence of the above-described catalyst composition. Particularly, the polymerization reaction may be performed using two or more reactors in a bimodal manner, or may be performed in a single polymerization reactor.

The polymerization temperature may be 25° C. to 500° C., or 25° C. to 200° C., or 50° C. to 150° C. In addition, the polymerization pressure may be 1 kgf/cm$^2$ to 100 kgf/cm$^2$, or 1 kgf/cm$^2$ to 50 kgf/cm$^2$, or 5 kgf/cm$^2$ to 40 kgf/cm$^2$.

When introducing 1-hexene as the comonomer in the copolymerization process, the amount of 1-hexene introduced may be about 2.0% by weight to about 6.0% by weight based on the total weight of ethylene introduced. More specifically, the amount of 1-hexene introduced may be about 2.1% by weight or greater, about 2.2% by weight or greater, about 2.3% by weight or greater, about 2.4% by weight or greater or about 2.5% by weight or greater, and about 5.9% by weight or less, about 5.8% by weight or less, about 5.6% by weight or less, about 5.4% by weight or less, about 5.2% by weight or less or about 5.0% by weight or less based on the total weight of ethylene introduced.

Meanwhile, the polyethylene resin according to the present disclosure may be prepared by copolymerizing ethylene and the comonomer through introducing hydrogen gas in the presence of the above-described catalyst composition.

For example, the content of the hydrogen gas may be 35 ppm to 250 ppm, 40 ppm to 200 ppm, 50 ppm to 190 ppm, 55 ppm to 180 ppm, or 55 ppm to 170 ppm with respect to the ethylene weight.

In the hybrid supported metallocene catalyst according to one aspect, the amounts of the carrier, the cocatalyst, the cocatalyst-supported carrier, and the second and third metallocene compounds used may be properly controlled depending on the intended properties or effects of the supported catalyst.

As a reaction solvent during the preparation of the hybrid supported catalyst, a hydrocarbon solvent such as pentane, hexane or heptane; or an aromatic solvent such as benzene or toluene may be used.

For a specific method for preparing the supported catalyst, Examples to be described later may be referred to. However, the method for preparing the supported catalyst is not limited to the description provided in the present specification, and the preparation method may additionally employ steps commonly employed in the technical field to which the present disclosure belongs, and the step(s) of the preparation method may be changed by step(s)· commonly changeable.

Meanwhile, the polyethylene copolymer as described above may be prepared using a method including a step of copolymerizing ethylene and alpha-olefin in the presence of the hybrid supported metallocene catalyst.

The above-described hybrid supported catalyst may have excellent support performance, catalytic activity and high copolymerizability, and may be used to prepare a polyethylene copolymer capable of manufacturing a biaxially stretched film having excellent expandable processing area characteristics and mechanical properties.

The method for preparing the (b) second ethylene-alpha-olefin copolymer may be performed using a slurry polymerization method by applying common device and contact technology with ethylene and alpha-olefin as raw materials in the presence of the above-described hybrid supported catalyst.

The method for preparing the (b) second ethylene-alpha-olefin copolymer may copolymerize ethylene and alpha-olefin using a continuous slurry polymerization reactor, a loop slurry reactor or the like, however, the method is not limited thereto.

In the hybrid supported metallocene catalyst of the present disclosure, a carrier for supporting the second metallocene compound and the third metallocene compound, an additionally included cocatalyst and the like, and a polymerization process are as described above relating to the (a) first ethylene-alpha-olefin copolymer, and specific description thereon will not be included.

As described above, the (b) second ethylene-alpha-olefin copolymer having the above-described property characteristics by using the supported metallocene catalyst described above may be prepared by copolymerizing ethylene and alpha-olefin.

II. Biaxially Stretched Film

The polyethylene composition according to the present disclosure having the above-described property characteristics may stably form a biaxially stretched film having high shrinkage resistance, printability and transparency, while maintaining excellent mechanical properties, productivity and stretching stability.

Meanwhile, the biaxially stretched film may be manufactured using a common film manufacturing method except that the polyethylene composition described above is used.

For example, as the biaxially stretched film according to the present disclosure, a polyethylene composition sheet may be prepared to a thickness of 0.75 mm using a lab extruder line (L/D ratio: 42, screw diameter: 25 mm, melt/T-die temperature: 220° C.) manufactured by Brückner. After that, the polyethylene composition sheet may be biaxially stretched to a sheet having a size of width×length of 90 mm×90 mm using a KARO 5.0 device to manufacture a biaxially stretched film.

In addition, the biaxially stretched film is manufactured using a polyethylene composition, and therefore, it may also be referred to as a polyethylene biaxially stretched film.

The biaxially stretched film according to the present disclosure may further include additives well known in the art in addition to the polyethylene copolymer described above. Specifically, such additives may include a solvent, a heat stabilizer, an antioxidant, a UV absorber, a light stabilizer, a metal deactivator, a filler, a reinforcing agent, a plasticizer, a lubricant, an emulsifier, a pigment, an optical bleaching agent, a flame retardant, an antistatic agent, a foaming agent or the like. The types of additives are not particularly limited, and general additives known in the art may be used.

The polyethylene biaxially stretched film according to the present disclosure manufactured using the above-described method may improve performance of excellent expandable processing area characteristics and mechanical properties.

The biaxially stretched film according to one aspect of the present disclosure satisfies an MD stretching ratio of 4 or greater or 5 or greater, and a TD stretching ratio of 6 or greater or 8 or greater.

The polyethylene biaxially stretched film may have tensile strength in an MD direction (MD/machine direction, film length direction, vertical direction) of 70 MPa or greater, 100 MPa or greater or 110 MPa or greater, and 150 MPa or less or 140 MPa or less, and tensile strength in a TD direction (TD/transverse direction, film width direction, horizontal direction) of 130 MPa or greater, 150 MPa or greater, 170 MPa or greater or 180 MPa or greater, and 250 MPa or less or 230 MPa or less, which are measured in accordance with the ASTM D 882 standard.

In addition, the polyethylene biaxially stretched film may have tensile modulus in an MD direction of 450 MPa or greater, 500 MPa or greater or 600 MPa or greater, and 1500 MPa or less, 1200 MPa or less or 1000 MPa or less, and tensile modulus in a TD direction of 600 MPa or greater, 700 MPa or greater or 800 MPa or greater, and 1600 MPa or less, 1400 MPa or less or 1200 MPa or less, which are measured in accordance with the ASTM D 882 standard.

In addition, the polyethylene biaxially stretched film may have tensile elongation in an MD direction of 150% to 300%, 200% to 300% or 220% to 280%, and tensile elongation in a TD direction of 50% to 140%, 70% to 140% or 85% to 125%, which are measured in accordance with the ASTM D 882 standard.

In addition, the polyethylene biaxially stretched film may have tearing strength in an MD direction of 6 N/mm to 14.8 N/mm or 6 N/mm to 13.1 N/mm, and tearing strength in a TD direction of 1.6 N/mm to 6.8 N/mm or 2.5 N/mm to 6.8 N/mm, which are measured in accordance with the ASTM 1922 standard.

In addition, the polyethylene biaxially stretched film may have a haze, which is measured in accordance with the ASTM 1003 standard, of 4% or less, 3% or less or 0% to 3%, or 2.8% or less, 2.5% or less, 2.3% or less, 2.2% or less, 2.0% or less or 1.9% or less, and, considering the limitation that the film actually has in obtaining the physical properties, may have a haze of 0.1% or greater, 0.5% or greater, 1.0% or greater, 1.5% or greater or 1.6% or greater.

In addition, the polyethylene biaxially stretched film may have gloss 45°, which is measured in accordance with the ASTM 2457 standard, of 80 GU or greater, or 80 GU to 100 GU, or 85 GU or greater, 88 GU or greater, 90 GU or greater or 94 GU or greater.

In addition, the polyethylene biaxially stretched film described above may be stretched in a stretching ratio of greater than 4 times, 4.5 times or greater or 5 times or less in an MD direction, and greater than 6 times, 6.5 times or greater or 8 times or less in a TD direction by having excellent stretchability and stretching stability.

For example, the polyethylene biaxially stretched film described above may have, under a condition of satisfying a stretching ratio of greater than 4 in an MD direction and a stretching ratio of greater than 6 in a TD direction, a shrinkage ratio sum in MD/TD directions of 6.0% or less, or 5.9% or less or 5.8% or less when shrunken for 7 minutes at 100° C. in accordance with the ASTM 1204 standard, or a shrinkage ratio sum in MD/TD directions of 22.0% or less, 21.5% or less or 21% or less when shrunken for 7 minutes at 120° C. in accordance with the ASTM 1204 standard.

In addition, the polyethylene biaxially stretched film described above may have puncture strength, which is measured in accordance with the EN 14477 standard, of 190 N/mm or greater, 300 N/mm or greater or 350 N/mm or greater, and 450 N/mm or less or 400 N/mm or less.

In the present disclosure, physical properties of the biaxially stretched film may be measured in accordance with the above-described standards.

In the present disclosure, a biaxially stretched film having high shrinkage resistance, printability and transparency while maintaining excellent mechanical properties, productivity and stretching stability may be stably manufactured by controlling a balance between mechanical properties and stretchability through blending the first ethylene-alphaolefin copolymer capable of providing stretchability by having excellent flowability and the second ethylene-alpha-olefin copolymer having excellent mechanical properties as described above.

Hereinafter, operations and effects of the present disclosure will be described in more detail through specific examples of aspects of the disclosure. However, such examples are provided only as an example of the disclosure, and the scope of a right of the disclosure is not determined thereby.

Synthesis Example 1

(1) Preparation of Transition Metal Compound (B, First Metallocene Compound)

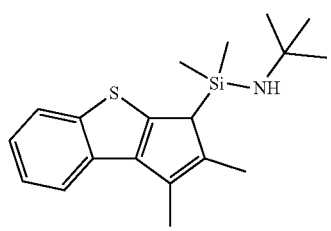

(A)

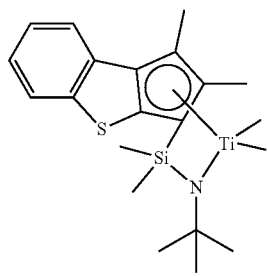

(B)

To a 50 mL Schlenk flask, a ligand compound (A) (1.06 g, 3.22 mmol/1.0 eq.) and MTBE (16.0 mL, 0.2 M) were introduced and stirred first. n-BuLi (2.64 mL, 6.60 mmol/2.05 eq., 2.5 M in THF) was introduced thereto at −40° C., and the mixture was reacted overnight at room temperature. After that, MeMgBr (2.68 mL, 8.05 mmol/2.5 eq., 3.0 M in diethyl ether) was slowly added dropwise thereto at −40° C., then TiCl$_4$ (2.68 mL, 3.22 mmol/1.0 eq., 1.0 M in toluene) was sequentially introduced thereto, and the mixture was reacted overnight at room temperature. After that, the reaction mixture was filtered through Celite using hexane. After drying the solvent, a transition metal compound (B), a brown solid, was obtained in a yield of 1.07 g (82%).

$^1$H-NMR (500 MHz, CDCl$_3$): δ 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), −0.45 (s, 3H)

Synthesis Example 2

(1) Preparation of Transition Metal Compound (C, Second Metallocene Compound)

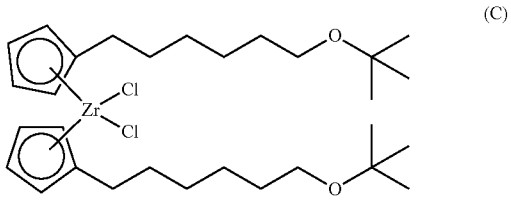

(C)

t-butyl-O—(CH$_2$)$_6$—Cl was prepared using a method described in the literature (Tetrahedron Lett. 2951 (1988)) using 6-chlorohexanol, and Na(C$_5$H$_5$) [NaCp] was reacted therewith to obtain t-butyl-O—(CH$_2$)$_6$—C$_5$H$_5$ (yield 60%, b.p. 80° C./0.1 mmHg).

In addition, the t-butyl-O—(CH$_2$)$_6$—C$_5$H$_5$ was dissolved in tetrahydrofuran (THF) at −78° C., and after slowly adding n-BuLi thereto, the temperature was raised to room temperature, and then the mixture was reacted for 8 hours. The synthesized lithium salt solution was slowly added to a suspension solution of ZrCl$_4$(THF)$_2$ (170 g, 4.50 mmol)/THF (30 mL) at −78° C. again, and the mixture was further reacted for 6 hours at room temperature. All volatile substances were removed by vacuum drying, and hexane was added to the obtained oily liquid substance for filtering. After vacuum drying the filter solution, hexane was added there to induce a precipitate at a low temperature (−20° C.). The obtained precipitate was filtered at a low temperature to obtain a transition metal compound (C) in a white solid form (yield 92%).

$^1$H-NMR (300 MHz, CDCl$_3$): δ 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C-NMR (CDCl$_3$): δ 135.09, 116.66, 112.28, 72.42, 61.52, 30.66, 30.31, 30.14, 29.18, 27.58, 26.00

Synthesis Example 3

(1) Preparation of Transition Metal Compound (D, Third Metallocene Compound)

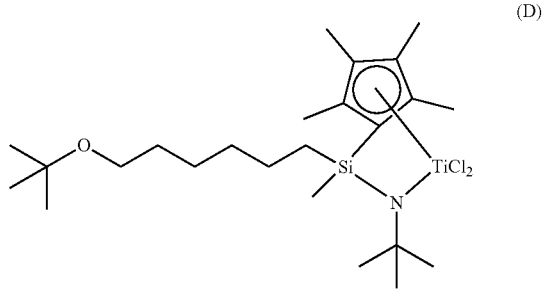

(D)

Mg(s) (50 g) was added to a 10 L reactor at room temperature, and then THF (300 mL) was added thereto. After adding I$_2$ (about 0.5 g) thereto, the reactor temperature was maintained at 50° C. After the reactor temperature was stabilized, 6-t-buthoxyhexyl chloride (250 g) was added to the reactor at a rate of 5 mL/min using a feeding pump.

It was observed that the reactor temperature increased by about 4° C. to 5° C. as 6-t-butoxyhexyl chloride was added. The mixture was stirred for 12 hours while continuously adding 6-t-butoxyhexyl chloride thereto. After reacting for 12 hours, a black reaction solution was obtained. 2 mL of the produced black solution was taken, and water was added thereto to obtain an organic layer, and 6-t-butoxyhexane was identified through $^1$H-NMR. Through this, it was able to be seen that the Grignard reaction proceeded well from 6-t-butoxyhexane. As a result, 6-t-butoxyhexyl magnesium chloride was synthesized.

MeSiCl$_3$ (500 g) and THF (1 L) were introduced to a reactor, and then the reactor temperature was lowered to −20° C. 560 g of the synthesized 6-t-butoxyhexyl magnesium chloride was added to the reactor at a rate of 5 mL/min using a feeding pump. After the feeding of the Grignard reagent was finished, the mixture was stirred for 12 hours while slowly raising the reactor temperature to room temperature. After reacting for 12 hours, production of a white MgCl$_2$ salt was identified. The salt was removed through a labdori by adding hexane (4 L) thereto to obtain a filter solution. The obtained filter solution was added to the reactor, and then hexane was removed at 70° C. to obtain a light-yellow liquid.

The obtained liquid was identified as a target methyl (6-t-butoxyhexyl)dichlorosilane compound through $^1$H-NMR.

$^1$H-NMR (300 MHz, CDCl$_3$): δ 3.3 (t, 2H), 1.5 (m, 3H), 1.3 (m, 5H), 1.2 (s, 9H), 1.1 (m, 2H), 0.7 (s, 3H)

Tetramethylcyclopentadiene (1.2 mol, 150 g) and THF (2.4 L) were introduced to a reactor, and then the reactor temperature was lowered to −20° C.

n-BuLi (480 mL) was added to the reactor at a rate of 5 mL/min using a feeding pump. After adding n-BuLi, the mixture was stirred for 12 hours while slowly raising the reactor temperature to room temperature. After reacting for 12 hours, an equivalent amount of methyl (6-t-butoxyhexyl)dichlorosilane (326 g, 350 mL) was rapidly added to the reactor. The mixture was stirred for 12 hours while slowly raising the reactor temperature to room temperature, and after lowering the reactor temperature again to 0° C., 2 equivalents of t-BuNH$_2$ was added thereto. The mixture was stirred for 12 hours while slowly raising the reactor temperature to room temperature. After reacting for 12 hours, THF was removed, and a filter solution from which the salt was removed through a labdori by adding hexane (4 L) thereto was obtained. After adding the filter solution to the reactor again, hexane was removed at 70° C. to obtain a yellow solution. The obtained yellow solution was identified as a methyl (6-t-butoxyhexyl)(tetramethylCpH)t-butylaminosilane compound through $^1$H-NMR.

To the dilithium salt of the ligand at −78° C. synthesized from n-BuLi and the ligand dimethyl(tetramethylCpH)t-butylaminosilane in a THF solution, TiCl$_3$(THF)$_3$ (10 mmol) was rapidly added. The reaction solution was stirred for 12 hours while slowly raising the reaction solution temperature from −78° C. to room temperature. After stirring for 12 hours, an equivalent amount of PbCl$_2$ (10 mmol) was added to the reaction solution at room temperature, and the mixture was stirred for 12 hours. After stirring for 12 hours, a dark black solution with a blue tint was obtained. THF was removed from the produced reaction solution, and hexane was added thereto to filter the product. After removing hexane from the obtained filter solution, a transition metal compound (D) was identified through $^1$H-NMR.

$^1$H-NMR (300 MHz, CDCl$_3$): δ 3.3 (s, 4H), 2.2 (s, 6H), 2.1 (s, 6H), 1.8~0.8 (m), 1.4 (s, 9H), 1.2 (s, 9H), 0.7 (s, 3H)

Synthesis Example 4

(1) Preparation of Ligand A 1-benzothiophene (4.0 g, 30 mmol) was dissolved in THF to prepare a 1-benzothiophene solution. Then, an n-BuLi solution (14 mL, 36 mmol, 2.5 M in hexane) and CuCN (1.3 g, 15 mmol) were added to the 1-benzothiophene solution. Subsequently, tigloyl chloride (3.6 g, 30 mmol) was slowly added to the solution at −80° C., and the obtained solution was stirred for about 10 hours at room temperature. After that, 10% HCl was poured into the solution to quench the reaction, and the organic layer was separated using dichloromethane to obtain (2E)-1-(1-benzothiophen-2-yl)-2-methyl-2-buten-1-one, a beige solid.

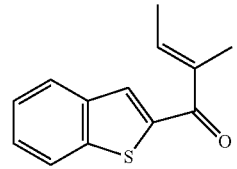

$^1$H NMR (CDCl$_3$): 7.85-7.82 (m, 2H), 7.75 (m, 1H), 7.44-7.34 (m, 2H), 6.68 (m, 1H), 1.99 (m, 3H), 1.92 (m, 3H)

While vigorously stirring a solution prepared by dissolving the (2E)-1-(1-benzothiophen-2-yl)-2-methyl-2-buten-1-one (5.0 g, 22 mmol) prepared above in chlorobenzene (5 mL), sulfuric acid (34 mL) was slowly added to the solution. Then, the solution was stirred for about 1 hour at room temperature. After that, ice water was poured into the solution, and the organic layer was separated using an ether solvent to obtain 1,2-dimethyl-1,2-dihydro-3H-benzo[b]cyclopenta[d]thiophen-3-one, a yellow solid (4.5 g, 91% yield).

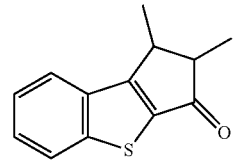

$^1$H NMR (CDCl$_3$): 7.95-7.91 (m, 2H), 7.51-7.45 (m, 2H), 3.20 (m, 1H), 2.63 (m, 1H), 1.59 (d, 3H), 1.39 (d, 3H)

To a solution prepared by dissolving the 1,2-dimethyl-1,2-dihydro-3H-benzo[b]cyclopenta[d]thiophen-3-one (2.0 g, 9.2 mmol) in a mixed solvent of THF (20 mL) and methanol (10 mL), NaBH$_4$ (570 mg, 15 mmol) was added at 0° C. Then, the solution was stirred for about 2 hours at room temperature. After that, HCl was added to the solution to adjust the pH to 1, and the organic layer was separated using an ether solvent to obtain an alcohol intermediate.

A solution was prepared by dissolving the alcohol intermediate in toluene. Then, p-toluenesulfonic acid (190 mg, 1.0 mmol) was added to the solution, and the mixture was refluxed for about 10 minutes. The obtained reaction mixture was separated by column chromatography to obtain 1,2-dimethyl-3H-benzo[b]cyclopenta[d]thiophene (ligand A), an orange-brown liquid (1.8 g, 9.0 mmol, 98% yield).

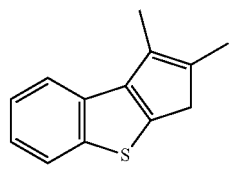

¹H NMR (CDCl₃): 7.81 (d, 1H), 7.70 (d, 1H), 7.33 (t, 1H), 7.19 (t, 1H), 6.46 (s, 1H), 3.35 (q, 1H), 2.14 (s, 3H), 1.14 (d, 3H)

(2) Preparation of Ligand B t-butylamine (13 mL, 120 mmol) and an ether solvent (20 mL) were introduced to a 250 mL Schlenk flask, and (6-tert-butoxyhexyl)dichloro(methyl)silane (16 g, 60 mmol) and an ether solvent (40 mL) were introduced to another 250 mL Schlenk flask to respectively prepare a t-butylamine solution and a (6-tert-butoxyhexyl)dichloro(methyl)silane solution. Then, after cooling the t-butylamine solution to −78° C., the (6-tert-butoxyhexyl)dichloro(methyl)silane solution was slowly injected to the cooled solution, and the mixture was stirred for about 2 hours at room temperature. The produced white suspension was filtered to obtain 1-(6-(tert-butoxy) hexyl)-N-(tert-butyl)-1-chloro-1-methylsilanamine (ligand B), an ivory liquid.

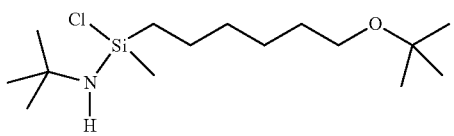 [SMILES: CC(C)(C)N[Si](C)(Cl)CCCCCCOC(C)(C)C]

¹H NMR (CDCl₃): 3.29 (t, 2H), 1:52-1.29 (m, 10H), 1.20 (s, 9H), 1.16 (s, 9H), 0.40 (s, 3H)

(3) Crosslinkage of Ligands A and B

To a 250 mL Schlenk flask, 1,2-dimethyl-3H-benzo[b]cyclopenta[d]thiophene (ligand A) (1.7 g, 8.6 mmol) was introduced, and THF (30 mL) was added thereto to prepare a ligand A solution. The ligand A solution was cooled to −78° C., then an n-BuLi solution (3.6 mL, 9.1 mmol, 2.5 M in hexane) was added to the ligand A solution, and the mixture was stirred overnight at room temperature to obtain a purple-brown solution. The solvent of the purple-brown solution was replaced with toluene, and a solution prepared by dispersing CuCN (39 mg, 0.43 mmol) in THF (2 mL) was injected to this solution to prepare solution A.

Meanwhile, solution B prepared by injecting 1-(6-(tert-butoxy) hexyl)-N-(tert-butyl)-1-chloro-1-methylsilanamine (ligand B) and toluene to a 250 mL Schlenk flask was cooled to −78° C. To the cooled solution B, the solution A prepared above was slowly injected. Then, the mixture of solutions A and B was stirred overnight at room temperature. Then, the produced solid was removed through filtering to obtain 1-(6-(tert-butoxy) hexyl)-N-(tert-butyl)-1-(1,2-dimethyl-3H-benzo[b]cyclopenta[d]thiophen-3-yl)-1-methylsilanamine (crosslinked product of ligands A and B), a brown viscous liquid (4.2 g, >99% yield).

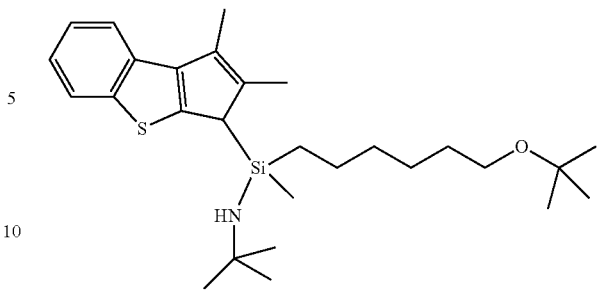

In order to identify the structure of the crosslinked product of ligands A and B, the crosslinked product was lithiated at room temperature, and a ¹H-NMR spectrum was obtained using a sample dissolved in a small amount of pyridine-D5 and CDCl₃.

¹H NMR (pyridine-D5 and CDCl₃): 7.81 (d, 1H), 7.67 (d, 1H), 7.82-7.08 (m, 2H), 3.59 (t, 2H), 3.15 (s, 6H), 2.23-1.73 (m, 10H), 2.15 (s, 9H), 1.91 (s, 9H), 1.68 (s, 3H)

(4) Preparation of Transition Metal Compound (Third Metallocene Compound)

1-(6-(tert-butoxy) hexyl)-N-(tert-butyl)-1-(1,2-dimethyl-3H-benzo[b]cyclopenta[d]thiophen-3-yl)-1-methylsilanamine (crosslinked product of ligands A and B) (4.2 g, 8.6 mmol) was introduced to a 250 mL Schlenk flask, and toluene (14 mL) and n-hexane (1.7 mL) were injected to the flask to dissolve the crosslinked product. This solution was cooled to −78° C., and then an n-BuLi solution (7.3 mL, 18 mmol, 2.5 M in hexane) was injected to the cooled solution.

Then, the solution was stirred for about 12 hours at room temperature. Subsequently, trimethylamine (5.3 mL, 38 mmol) was introduced to the solution, and this solution was stirred for about 3 hours at about 40° C. to prepare solution C. Meanwhile, to a separately prepared 250 mL Schlenk flask, TiCl₄ (THF) 2 (2.3 g, 8.6 mmol) and toluene (10 mL) were added to prepare solution D in which TiCl₄(THF)₂ was dispersed in toluene. The solution C prepared above was slowly injected to the solution D at −78° C., and the mixture of solutions C and D was stirred for about 12 hours at room temperature. After that, the solvent of the solution was removed under reduced pressure, and the obtained solute was dissolved in toluene. Then, the solid that was not dissolved in toluene was filtered and removed, and the solvent was removed from the filtered solution to obtain a transition metal compound in a brown solid form (4.2 g, 83% yield).

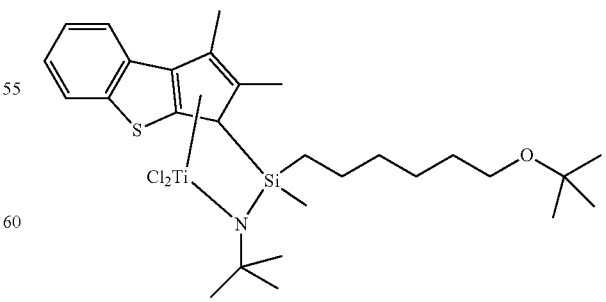

¹H NMR (CDCl₃): 8.01 (d, 1H), 7.73 (d, 1H), 7.45-7.40 (m, 2H), 3.33 (t, 2H), 2.71 (s, 3H), 2.33 (d, 3H), 1.38 (s, 9H), 1.18 (s, 9H), 1.80-0.79 (m, 10H), 0.79 (d, 3H)

<Preparation of Supported Catalyst>

1) Catalyst Preparation Example 1: Preparation of Hybrid Supported Metallocene Catalyst 1

A toluene solution (5.0 kg) was introduced to a 20 L sus high-pressure reactor, and the reactor temperature was maintained at 40° C. Silica (manufactured by Grace Davison, SYLOPOL 948) (1,000 g) dehydrated by applying vacuum for 12 hours at a temperature of 600° C. was introduced to the reactor, and after sufficiently dispersing the silica, a second metallocene compound (80 g), which is the transition metal compound (C) obtained in Synthesis Example 2, dissolved in toluene was introduced thereto, and the mixture was stirred and reacted for 2 hours at 200 rpm and 40° C. After that, the stirring was stopped, and the reaction solution was allowed to settle for 30 minutes and then decanted.

Toluene (2.5 kg) was introduced to the reactor, and after introducing a 10 wt % methylaluminoxane (MAO)/toluene solution (9.4 kg) thereto, the mixture was stirred for 12 hours at 200 rpm and 40° C. After the reaction, the stirring was stopped, and the reaction solution was allowed to settle for 30 minutes and then decantated. Toluene (3.0 kg) was introduced thereto, and after stirring the mixture for 10 minutes, the stirring was stopped, and the toluene solution was allowed to settle for 30 minutes and then decanted.

Toluene (3.0 kg) was introduced to the reactor, and after introducing a 29.2 wt % third metallocene compound/toluene solution (314 mL), which is the transition metal compound (D) obtained in Synthesis Example 3, to the reactor, the mixture was stirred and reacted for 2 hours at 200 rpm and 40° C. Herein, the first metallocene compound and the second metallocene compound had a molar ratio of 1:5 (number of moles of first metallocene compound: number of moles of second metallocene compound). After lowering the reactor temperature to room temperature, the stirring was stopped, and the reaction solution was allowed to settle for 30 minutes and then decanted.

Toluene (2.0 kg) was introduced to the reactor, and after stirring the mixture for 10 minutes, the stirring was stopped, and the reaction solution was allowed to settle for 30 minutes, and then decanted.

Hexane (3.0 kg) was introduced to the reactor, the hexane slurry was transferred to a filter dryer, and the hexane solution was filtered. The result was dried for 4 hours at 40° C. under reduced pressure to prepare a $SiO_2$ hybrid supported catalyst (910 g).

2) Catalyst Preparation Example 2: Preparation of Hybrid Supported Metallocene Catalyst 2

A toluene solution (3.0 kg) was introduced to a 20 L sus high-pressure reactor, and the reactor temperature was maintained at 40° C. Silica (Grace Davison, SP2212) (500 g) dehydrated by applying vacuum for 12 hours at a temperature of 600° C. was introduced to the reactor, and after sufficiently dispersing the silica, a 10 wt % methylaluminoxane (MAO)/toluene solution (2.78 kg) was introduced thereto, and the mixture was stirred for 15 hours or longer at 200 rpm and 80° C.

After lowering the reactor temperature to 40° C., a second metallocene compound/toluene solution (7.8 wt % in toluene) (200 g), the transition metal compound prepared in Synthesis Example 2, was introduced to the reactor, and the mixture was stirred for 1 hour at 200 rpm. Subsequently, a third metallocene compound/toluene solution (7.8 wt % in toluene) (250 g), the transition metal compound prepared in Synthesis Example 4, was introduced to the reactor, and the mixture was stirred for 1 hour at 200 rpm (molar ratio between second metallocene compound and third metallocene compound=1:1.3).

A cocatalyst (anilinium tetrakis(pentafluorophenyl)borate) (70 g) diluted in toluene was introduced to the reactor, and the mixture was stirred for 15 hours or longer at 200 rpm. After lowering the reactor temperature to room temperature, the stirring was stopped, and the reaction solution was allowed to settle for 30 minutes and then decanted.

The toluene slurry was transferred to a filter dryer, and filtered. Toluene (3.0 kg) was introduced thereto, and after stirring the mixture for 10 minutes, the stirring was stopped, and the mixture was filtered. Hexane (3.0 kg) was introduced to the reactor, and after stirring the mixture for 10 minutes, the stirring was stopped, and the mixture was filtered. The result was dried for 4 hours at 50° C. under reduced pressure to prepare $SiO_2$ supported catalyst (500 g).

Preparation of Ethylene-Alpha-Olefin Copolymer

Preparation Example 1: Preparation of Ethylene/1-Hexene Copolymer (PE-a)

An ethylene/1-hexene copolymer (PE-a) was slurry polymerized in the presence of the hybrid supported catalyst prepared in Catalyst Preparation Example 1.

Herein, the polymerization reactor is a continuous polymerization reactor of an isobutane (i-C4) slurry loop process, and the reactor had a volume of 140 L and was operated at a reaction flow rate of about 7 m/s. Gases (ethylene, hydrogen) required for the polymerization and 1-hexene, a comonomer, were continuously introduced at a constant rate, and the individual flow rate was adjusted to suit a target product. Herein, the amount of ethylene supply was adjusted to 31.1 kg/hr, the amount of 1-hexene introduction was adjusted to 2.5 wt % with respect to the ethylene, and the amount of hydrogen introduction was adjusted to 56 ppm with respect to the ethylene.

In addition, the concentrations of all the gases and the 1-hexene, a comonomer, of Preparation Example 1 were checked by on-line gas chromatography. The supported catalyst was prepared and introduced as an isobutane slurry having a concentration of 4% by weight, and the reactor pressure was maintained at about 40 bar, and the polymerization temperature was about 80° C.

Preparation Example 2: Preparation of Ethylene/1-Hexene Copolymer (PE-b)

An ethylene/1-hexene copolymer was prepared through a monomodal-type polymerization process.

Specifically, an ethylene/1-hexene copolymer (PE-b) was prepared through a polymerization reaction (polymerization temperature 93° C., polymerization pressure 7.7 kgf/cm²) in one loop-type reactor using the hybrid supported metallocene catalyst 2 prepared in Catalyst Preparation Example 2 and a hexane slurry stirred tank process polymerization reactor under a condition of an amount of ethylene supply of 10.0 kg/hr, an amount of 1-hexene, a comonomer, introduction of 6.3 ml/min and an amount of hydrogen introduction of 1.73 g/hr.

Preparation Example 3: Preparation of Ethylene/1-Butene Copolymer (PE-c)

As an ethylene/1-butene copolymer (PE-c), a commercially available product (LG Chem ME1000, Ziegler-Natta catalyst) was used.

Preparation Example 4: Preparation of Ethylene/1-Hexene Copolymer (PE-d)

As an ethylene/1-hexene copolymer (PE-d), a commercially available product (LG Chem SP980, metallocene catalyst) was used.

Preparation Example 5: Preparation of Homo-Polyethylene (PE-e)

As a homo-polyethylene (PE-e), a commercially available product (LG Chem SP380, metallocene catalyst) was used.

Preparation Example 6: Preparation of Ethylene/1-Octene Copolymer (PE-f)

A 1.5 L continuous process reactor was preheated at 120° C. while introducing a hexane solvent at 5 kg/h and 1-octene at 0.31 kg/h thereto. Triisobutylaluminum (Tibal, 0.045 mmol/min), the first metallocene compound, which is the transition metal compound (B) obtained in Synthesis Example 1 and a dimethylanilinium tetrakis(pentafluorophenyl)borate cocatalyst (2.6 μmol/min) were introduced to the reactor at the same time. Subsequently, ethylene (0.87 kg/h) and hydrogen gas (10 cc/min) were introduced into the reactor, and a copolymerization reaction was performed by maintaining a temperature at 160.0° C. for 60 minutes or longer in a continuous process at a pressure of 89 bar to obtain an ethylene/1-octene copolymer (PE-f).

Experimental Example 1: Evaluation on Properties of Polyethylene

Properties of the ethylene-alpha-olefin copolymers prepared in Preparation Examples 1 to 5 were measured using methods described below, and the results are shown in the following Table 1.

(1) Density

Density (g/cm$^3$) was measured using a density gradient tube in accordance with the ASTM D 1505 standard of the American Society for Testing and Materials.

(2) Melt Index

A melt index (MI2.16) was measured with a load of 2.16 kg at 190° C. in accordance with the ASTM D 1238 standard (condition E, 190° C., 2.16 kg) of the American Society for Testing and Materials (measurement device: MI-4 manufactured by Göttfert), and the melt index was expressed as a weight (g) of the polymer melted for 10 minutes.

(3) Number Average Molecular Weight, Weight Average Molecular Weight and Molecular Weight Distribution For each of the ethylene-alpha-olefin copolymers prepared in Preparation Examples 1 to 5, a weight average molecular weight (Mw, g/mol) and a number average molecular weight (Mn, g/mol) were measured in accordance with the ASTM D 6474 standard of the American Society for Testing and Materials using gel permeation chromatography (GPC, manufactured by Waters), and molecular weight distribution (Mw/Mn, PDI, polydispersity index) was calculated by dividing the weight average molecular weight by the number average molecular weight.

Specifically, as the gel permeation chromatography (GPC) device, a Waters PLGPC220 device was used, and a Polymer Laboratories PLgel MIX-B 300 mm length column was used. Herein, the measurement temperature was 160° C., 1,2,4-trichlorobenzene was used as the solvent, and the flow rate was 1 mL/min. Each sample of the ethylene-alpha-olefin copolymers prepared in Preparation Examples 1 to 5 was pretreated by being melted for 10 hours at 160° C. in 1,2,4-trichlorobenzene including 0.0125% of BHT using a GPC analysis device (PL-GP220), then prepared at a concentration of 10 mg/10 mL, and then supplied in an amount of 200 μL. The Mw and the Mn values were induced using a calibration curve formed using a polystyrene standard specimen. As the polystyrene standard specimen, 9 types having a weight average molecular weight of 2,000 g/mol, 10,000 g/mol, 30,000 g/mol, 70,000 g/mol, 200,000 g/mol, 700,000 g/mol, 2,000,000 g/mol, 4,000,000 g/mol and 10,000,000 g/mol were used.

TABLE 1

| Comonomer | Density (g/cm$^3$) | MI2.16 kg (g/10 min) | Mn (g/mol) | Mw (g/mol) | Mw/Mn |
|---|---|---|---|---|---|
| PE-a | 1-Hexene | 0.941 | 0.6 | 28,000 | 114,000 | 4.1 |
| PE-b | 1-Hexene | 0.948 | 0.2 | 15,000 | 200,000 | 13.1 |
| PE-c | 1-Butene | 0.952 | 0.9 | 10,000 | 137,000 | 14.1 |
| PE-d | 1-Hexene | 0.938 | 0.6 | 26,800 | 123,300 | 4.6 |
| PE-e | homo PE | 0.952 | 0.6 | 38,700 | 132,600 | 3.4 |
| PE-f | 1-Octene | 0.900 | 6.0 | 30,000 | 68,000 | 2.3 |

Preparation of Polyethylene Composition—Examples 1 to 4 and Comparative Examples 1 to 4

Using the ethylene-alpha-olefin copolymers of Preparation Examples 1 to 6 described above, polyethylene compositions of Examples 1 to 4 and Comparative Examples 1 to 4 were each prepared with the compositions shown in the following Table 2.

Specifically, each of the polyethylene compositions was prepared by performing extrusion and granulation using a twin extruder device under a condition of a hopper of 18 rpm, a screw of 350 rpm and 220° C. (extruder: TEK30MHS manufactured by SMPLATEK, L/D ratio=40, die diameter: 4 mm).

TABLE 2

| Polyethylene Composition | Composition | |
|---|---|---|
| Example 1 | PE-a 70 wt % | PE-f 30 wt % |
| Example 2 | PE-a 80 wt % | PE-f 20 wt % |
| Example 3 | PE-b 70 wt % | PE-f 30 wt % |
| Example 4 | PE-6 80 wt % | PE-f 20 wt % |
| Comparative Example 1 | PE-a 50 wt % | PE-f 50 wt % |
| Comparative Example 2 | PE-c 70 wt % | PE-f 30 wt % |
| Comparative Example 3 | PE-e 70 wt % | PE-f 30 wt % |
| Comparative Example 4 | PE-d 70 wt % | PE-f 30 wt % |

As may be identified in Table 2, two types of ethylene-alpha-olefin copolymers were used in each of the polyethylene compositions of Examples 1 to 4 and Comparative Examples 1 to 4. For example, the polyethylene composition of Example 1 includes 70 wt % of the ethylene-alpha-olefin copolymer PE-a and 30 wt % of the ethylene-alpha-olefin copolymer PE-f. This may be expressed as PE-a 70 wt %+PE-f 30 wt %. For the polyethylene compositions of Examples 2 to 4 and Comparative Examples 1 to 4, the same explanation may be applied.

Experimental Example 2: Evaluation on Properties of Polyethylene Composition Properties of the polyethylene compositions prepared in Examples 1 to 4 and Comparative Examples 1 to 4 were measured using methods described below, and the results are shown in the following Tables 2 and 3.

(1) Ethylene Sequence Analysis according to SSA Analysis

Step 1) Stepwise Annealing

① (Heating) The polyolefin composition of Example 1 was set to a first heating temperature of 180° C. and then heated for 20 minutes, allowing the polyolefin composition at room temperature (approximately 25° C.) to reach the first heating temperature of 180° C. The polyolefin composition of Example 1 was heated for 20 minutes after setting the first heating temperature at 180° C.

② (Rapid cooling) Then, the polyolefin composition of Example 1 was cooled at a rate of 20° C./min for 1.75 minutes until the temperature of the polyolefin composition reached 145° C. (rapidly cooled). Thereafter, the temperature was maintained for 20 minutes.

③ (Cooling) Additionally, the polyolefin composition at 145° C. was cooled at a rate of 10° C./min for approximately 16.5 minutes until the temperature of the polyolefin composition reached 30° C. Thereafter, the temperature was maintained for 5 minutes.

④ Then, the processes of heating, rapid cooling, and cooling for the polyolefin composition of Example 1 were repeated in the same manner as described above, except that the $(n+1)^{th}$ heating temperature was set 5° C. lower than the $n^{th}$ heating temperature for each cycle. Specifically, the processes of heating, rapid cooling, and cooling for the polyolefin composition of Example 1 were repeated until the $(n+1)^{th}$ heating temperature reached 60° C.

⑤ When the $(n+1)^{th}$ heating temperature reached 60° C., the $(n+2)^{th}$ heating temperature was set 10° C. lower than the $(n+1)^{th}$ heating temperature for each cycle, except for this adjustment, the processes of heating, rapid cooling, and cooling for the polyolefin composition of Example 1 were repeated in the same manner as described above. Specifically, the processes of heating, rapid cooling, and cooling were repeated for the polyolefin composition until the $(n+2)^{th}$ heating temperature reached 40° C.

Step 2) Deriving SSA thermogram

① After cooling the polyolefin composition to 30° C. in the final annealing step, the temperature of the polyolefin composition of Example 1, which was maintained for 1 minute, was lowered to −50° C.

② While heating the polyolefin composition, which was cooled to −50° C., to 180° C. at a rate of 10° C./min, an SSA thermogram as shown in FIG. 1 was derived.

Step 3) Obtaining Area Ratio (C)

In the SSA thermogram, the temperature region where the lamellar peak did not appear was set as a baseline; and areas for the entire temperature region and the temperature region of 128° C. or higher were obtained.

Then, using the following Calculation Formula 1, C, which is the ratio of the area for the temperature region of 128° C. or higher with respect to the area for the entire temperature region, was obtained.

$$C=B/A$$  [Calculation Formula 1]

In Calculation Formula 1,

A means the area for the entire temperature region in the SSA thermogram, and

B means the area for the temperature region of 128° C. or higher in the SSA thermogram.

For each of the polyethylene compositions of Examples 2 to 4 and Comparative Examples 1 to 4, the same process was performed. SSA thermograms derived from the results of the polyethylene compositions of Examples 2 to 4 and Comparative Examples 1 to 4 are as shown in FIGS. 2 and 3, respectively.

The results calculated by Calculation Formula 1 are described in the following Table 3.

TABLE 3

| | Example 1 | Example 2 | Example 3 | Example 4 | Comparative Example 1 | Comparative Example 2 | Comparative Example 3 | Comparative Example 4 |
|---|---|---|---|---|---|---|---|---|
| C (B/A) | 0.228 | 0.163 | 0.305 | 0.224 | 0.027 | 0.426 | 0.623 | 0.150 |

(2) Density, Melt Index (MI2.16), Weight Average Molecular Weight (Mw, g/Mol), Number Average Molecular Weight (Mn, g/Mol) and Molecular Weight Distribution (Mw/Mn, PDI)

First, density, a melt index (MI2.16), a weight average molecular weight (Mw, g/mol), a number average molecular weight (Mn, g/mol) and molecular weight distribution (Mw/Mn, PDI) of each of the polyethylene compositions were measured in the same manner as in Experimental Example 1 described above. The results are described in the following Table 4.

(3) Melting Temperature, Crystallization Temperature and Crystallinity

A melting temperature (Tm), a crystallization temperature (Tc) and crystallinity (Xc) of each of the polyethylene compositions of Examples 1 to 4 and Comparative Examples 1 to 4 were measured using a differential scanning calorimeter (DSC, device name: DSC Q20, manufacturer: TA instrument).

Specifically, the temperature was raised to heat the polyethylene composition to 180° C. at 10° C./min (Cycle 1), and then maintained (isothermal) at 180° C. for 5 minutes, then lowered to 0° C. at 10° C./min, then maintained (isothermal) for 5 minutes at 30° C., and then raised again to 180° C. at 10° C./min (Cycle 2). In the DSC curve obtained therethrough, the temperature at the maximum point of the endothermic peak was measured as the melting temperature (Tm, ° C.), and the temperature of the maximum point of the exothermic peak is measured as the crystallization temperature (Tc, ° C.). Herein, the melting temperature (Tm) and the crystallization temperature (Tc) are expressed as the results measured in the section where the second temperature increased and decreased, respectively (Cycle 2).

In addition, heat of fusion ΔHm was obtained as the area of the melting peak in the section where the second temperature increased (Cycle 2), and this value was divided by H°m=293.6 J/g, a theoretical value when crystallinity is 100%, to obtain the crystallinity (Xc, %).

The results are described in the following Table 4.

TABLE 4

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Composition | PE-a 70 wt % + PE-f 30 wt % | PE-a 80 wt % + PE-f 20 wt % | PE-b 70 wt % + PE-f 30 wt % | PE-b 80 wt % + PE-f 20 wt % | PE-a 50 wt % + PE-f 50 wt % | PE-c 70 wt % + PE-f 30 wt % | PE-e 70 wt % + PE-f 30 wt % | PE-d 70 wt % + PE-f 30 wt % |
| $MI_{2.16}$ (g/10 min) | 1.1 | 0.9 | 0.4 | 1.7 | 1.8 | 1.6 | 1.0 | 1.2 |
| Density (g/cm³) | 0.931 | 0.935 | 0.935 | 0.927 | 0.924 | 0.940 | 0.939 | 0.929 |
| Mn (g/mol) | 31,000 | 30,000 | 19,000 | 29,000 | 30,000 | 8,900 | 37,000 | 27,000 |
| Mw (g/mol) | 106,000 | 111,000 | 158,000 | 93,000 | 93,000 | 115,000 | 109,000 | 118,000 |
| Mw/Mn | 3.4 | 3.7 | 8.3 | 3.2 | 3.1 | 12.9 | 3.0 | 4.4 |
| Tm (°C) | 127.9 | 128.4 | 128.0 | 126.3 | 126.6 | 130.3 | 132.9 | 126.5 |
| Tc (°C) | 113.7 | 113.4 | 113.9 | 111.6 | 113.3 | 116.1 | 116.3 | 113.0 |
| Xc (%) | 40.8 | 43.9 | 45.2 | 38.5 | 36.9 | 51.8 | 45.8 | 38.7 |

Experimental Example 3: Manufacture of Biaxially Stretched Film And Evaluation on Properties Thereof Biaxially stretched films were manufactured using the polyethylene compositions prepared in Examples 1 to 4 and Comparative Examples 1 to 4 using the following method, and properties of each of the biaxially stretched films were measured, and the results are shown in Table 5.

(1) Manufacture of Biaxially Stretched Film

A polyethylene composition sheet was prepared to a thickness of 0.75 mm using a lab extruder line (L/D ratio: 42, screw diameter: 25 mm, melt/T-die temperature: 220° C.) manufactured by Brückner.

The sheet was biaxially stretched to a polyethylene composition sheet having a size of width×length of 90 mm×90 mm using a KARO 5.0 device.

For each of the sheets, sequential stretching (MD→TD) was performed after preheating for 80 seconds under the following condition.

1) Example 1: preheating and stretching under a condition of 120° C.
2) Example 2: preheating and stretching under a condition of 125° C.
3) Examples 3 and 4: preheating and stretching under a condition of 122° C.
4) Comparative Example 1: preheating and stretching under a condition of 115° C.
5) Comparative Examples 2 and 4: preheating and stretching under a condition of 125° C.
6) Comparative Example 3: stretching was attempted under the same condition as in Comparative Example 2, however, it was determined that stretching was not possible.

(2) Evaluation on Properties of Biaxially Stretched Film

Tensile strength (MPa), tensile modulus (MPa) and tensile elongation (%): measured in each direction of MD/TD in accordance with the ASTM D 882 standard Haze (haze, %): measured in accordance with the ASTM 1003 standard Puncture strength (N/mm): measured in accordance with the EN 14477 standard

TABLE 5

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Maximum Stretching Ratio (MD × TD) | | 5 × 8 | 5 × 8 | 5 × 8 | 5 × 8 | 4 × 6 | 4 × 6 | non-elongatable | 5 × 8 |
| Haze | | 1.6 | 1.7 | 1.9 | 3.7 | 2.0 | 9.5 | — | 3.6 |
| Tensile Modulus (MPa) | MD | 645 | 770 | 653 | 461 | 308 | 657 | — | 480 |
| | TD | 944 | 1007 | 940 | 718 | 383 | 689 | — | 623 |
| Tensile Strength (MPa) | MD | 130 | 134 | 123 | 108 | 90 | 62 | — | 71 |
| | TD | 203 | 200 | 203 | 167 | 134 | 102 | — | 135 |
| Puncture Strength (N/mm) | | 357.0 | 388.3 | 362.0 | 316.0 | 269.8 | 211.4 | — | 198.0 |

Based on the results of Tables 3 to 5, a biaxially stretched film having an excellent maximum stretching ratio was able to be manufactured from the polyethylene composition according to the present disclosure satisfying Equation 1.

In other words, it was able to be identified that a biaxially stretched film having excellent stretching stability was able to be manufactured using the polyethylene composition according to the present disclosure. In addition, it was able to be identified that the manufactured biaxially stretched film had excellent mechanical properties as well. Among these, it was able to be identified that mechanical properties were more superior when performing biaxial stretching using the polyethylene compositions of Examples 1 to 3.

This seems to be due to the fact that, when satisfying Equation 1, the polyethylene in the polyethylene composition has excellent ethylene sequence length distribution.

In other words, it was identified that the polyethylene composition according to the present disclosure satisfying Equation 1 has a structure suitable for manufacturing a biaxially stretched film having excellent properties such as high shrinkage resistance, printability and transparency.

A polyethylene composition of the present disclosure is capable of manufacturing a biaxially stretched film having excellent stretching stability such as a maximum stretching ratio, and having excellent mechanical properties.

A biaxially stretched film of the present disclosure has excellent stretching stability such as a maximum stretching ratio, and has excellent mechanical properties.

What is claimed is:

1. A polyethylene composition comprising one or more types of ethylene-alpha-olefin copolymers,
    wherein the polyethylene composition has a melting point Tm of 125° C. to 129° C., a crystallization temperature Tc of 110° C. to 115° C., and a crystallinity Xc of 35% to 48%, and
    wherein, in the polyethylene composition, a successive self-nucleation and annealing (SSA) thermogram representing a relationship between heat flow and temperature satisfies Equation 1:

$$0.16 \leq B/A \leq 0.4 \qquad \text{[Equation 1]}$$

in Equation 1,
    A means an area for an entire temperature region in the SSA thermogram; and
    B means an area for a temperature region of 128° C. or higher in the SSA thermogram.

2. The polyethylene composition of claim 1, wherein the polyethylene composition has density of 0.925 g/cm³ to 0.950 g/cm³.

3. The polyethylene composition of claim 1, wherein the polyethylene composition has a number average molecular weight Mn of 16,000 g/mol or greater, a weight average molecular weight Mw of 80,000 g/mol or greater, and a molecular weight distribution Mw/Mn of 10.0 or less.

4. The polyethylene composition of claim 1, comprising:
    (a) a first ethylene-alpha-olefin copolymer; and
    (b) a second ethylene-alpha-olefin copolymer,
    wherein the first ethylene-alpha-olefin copolymer has density of 0.870 g/cm³ to 0.920 g/cm³ and a melt index (MI2.16, 190° C., 2.16 kg load) of 3.0 g/10 min to 10.0 g/10 min, and
    the second ethylene-alpha-olefin copolymer has density of 0.930 g/cm³ to 0.960 g/cm³ and a melt index (MI2.16, 190° C., 2.16 kg load) of 0.2 g/10 min to 2.0 g/10 min.

5. The polyethylene composition of claim 4, wherein the first ethylene-alpha-olefin copolymer is included in an amount of greater than 0% by weight and 40% by weight or less, and the second ethylene-alpha-olefin copolymer is included in an amount of 60% by weight or greater and less than 100% by weight.

6. The polyethylene composition of claim 4, wherein the first ethylene-alpha-olefin copolymer has a number average molecular weight Mn of 20,000 g/mol or greater, a weight average molecular weight Mw of 60,000 g/mol or greater and less than 95,000 g/mol, and a molecular weight distribution Mw/Mn of 2.0 or greater and less than 3.5.

7. The polyethylene composition of claim 4, wherein the second ethylene-alpha-olefin copolymer has a number average molecular weight Mn of 12,000 g/mol or greater, a weight average molecular weight Mw of 80,000 g/mol or greater and 150,000 g/mol or less, and a molecular weight distribution Mw/Mn of 3.5 or greater and 14.0 or less.

8. A biaxially stretched film comprising a polyethylene composition comprising one or more types of ethylene-alpha-olefin copolymer,
    wherein, in the polyethylene composition, a successive self-nucleation and annealing (SSA) thermogram representing a relationship between heat flow and temperature satisfies Equation 1:

$$0.16 \leq B/A \leq 0.4 \qquad \text{[Equation 1]}$$

in Equation 1,
    A means an area for an entire temperature region in the SSA thermogram; and
    B means an area for a temperature region of 128° C. or higher in the SSA thermogram.

9. The biaxially stretched film of claim 8, wherein the biaxially stretched film satisfies a maximum machine direction (MD) stretching ratio of greater than 4 and a maximum transverse direction (TD) stretching ratio of greater than 6.

10. The biaxially stretched film of claim 8, wherein the biaxially stretched film has a shrinkage ratio sum in MD/TD directions of 6.0% or less when shrunken for 7 minutes at 100° C.

11. The biaxially stretched film of claim 8, wherein the biaxially stretched film has a shrinkage ratio sum in MD/TD directions of 22.0% or less when shrunken for 7 minutes at 120° C.

12. The biaxially stretched film of claim 8, wherein the biaxially stretched film has a tensile strength in an MD direction of 70 MPa or greater and a tensile strength in a TD direction of 130 MPa or greater.

13. The biaxially stretched film of claim 8, wherein the biaxially stretched film has a tensile modulus in a MD direction of 450 MPa or greater and a tensile modulus in a TD direction of 600 MPa or greater.

14. The biaxially stretched film of claim 8, wherein the biaxially stretched film has a tensile elongation in an MD direction of 150% to 300% and a tensile elongation in a TD direction of 50% to 140%.

15. The biaxially stretched film of claim 8, wherein the biaxially stretched film has a tearing strength in a MD direction of 6 N/mm to 14.8 N/mm and a tearing strength in a TD direction of 1.6 N/mm to 6.8 N/mm.

16. The biaxially stretched film of claim 8, wherein the biaxially stretched film has a puncture strength of 190 N/mm or greater.

* * * * *